United States Patent

Uchiyama et al.

[11] Patent Number: 5,884,169
[45] Date of Patent: Mar. 16, 1999

[54] ROAMING MOBILE COMMUNICATION SYSTEM AND METHOD

[75] Inventors: Yasuyuki Uchiyama; Hiroshi Nakamura, both of Tokyo, Japan

[73] Assignee: NTT Mobile Communications Network Inc., Tokyo, Japan

[21] Appl. No.: 700,429
[22] PCT Filed: Dec. 28, 1995
[86] PCT No.: PCT/JP95/02760
 § 371 Date: Sep. 4, 1996
 § 102(e) Date: Sep. 4, 1996
[87] PCT Pub. No.: WO96/21326
 PCT Pub. Date: Jul. 11, 1996

[30] Foreign Application Priority Data

Jan. 5, 1995 [JP] Japan ................................. 7-000386

[51] Int. Cl.⁶ ............................................... H04Q 7/22
[52] U.S. Cl. .............................................................. 455/433
[58] Field of Search ................................. 455/432, 433

[56] References Cited

U.S. PATENT DOCUMENTS

| | | | |
|---|---|---|---|
| 5,497,412 | 3/1996 | Lannen et al. | 455/432 |
| 5,610,974 | 3/1997 | Lantto | 455/433 |
| 5,659,544 | 8/1997 | LaPorta et al. | 455/433 |

Primary Examiner—Andrew M. Dolinar
Attorney, Agent, or Firm—Oblon, Spivak, McClelland, Maier & Neustadt, P.C.

[57] ABSTRACT

A scheme for enabling a roaming call termination connection for a mobile subscriber between mobile communication networks adopting different roaming number allocation schemes is disclosed. A first mobile communication network in which a visited location register of a visited network temporarily allocates a roaming number at a time of call termination connection and a second mobile communication network in which a gateway location register of a visited network allocates a roaming number at a time of position registration are connected through an interworking location register, which functions as a visited location register from a viewpoint of the first mobile communication network and as a home location register from a viewpoint of the second mobile communication network when a mobile subscriber of the first mobile communication network roams to the second mobile communication network, and functions as a home location register from a viewpoint of the first mobile communication network and as a gateway location register from a viewpoint of the second mobile communication network when a mobile subscriber of the second mobile communication network roams to the first mobile communication network, in a position registration and call termination connection control operation at a time of roaming of a mobile subscriber.

21 Claims, 20 Drawing Sheets

PRIOR ART
FIG.6

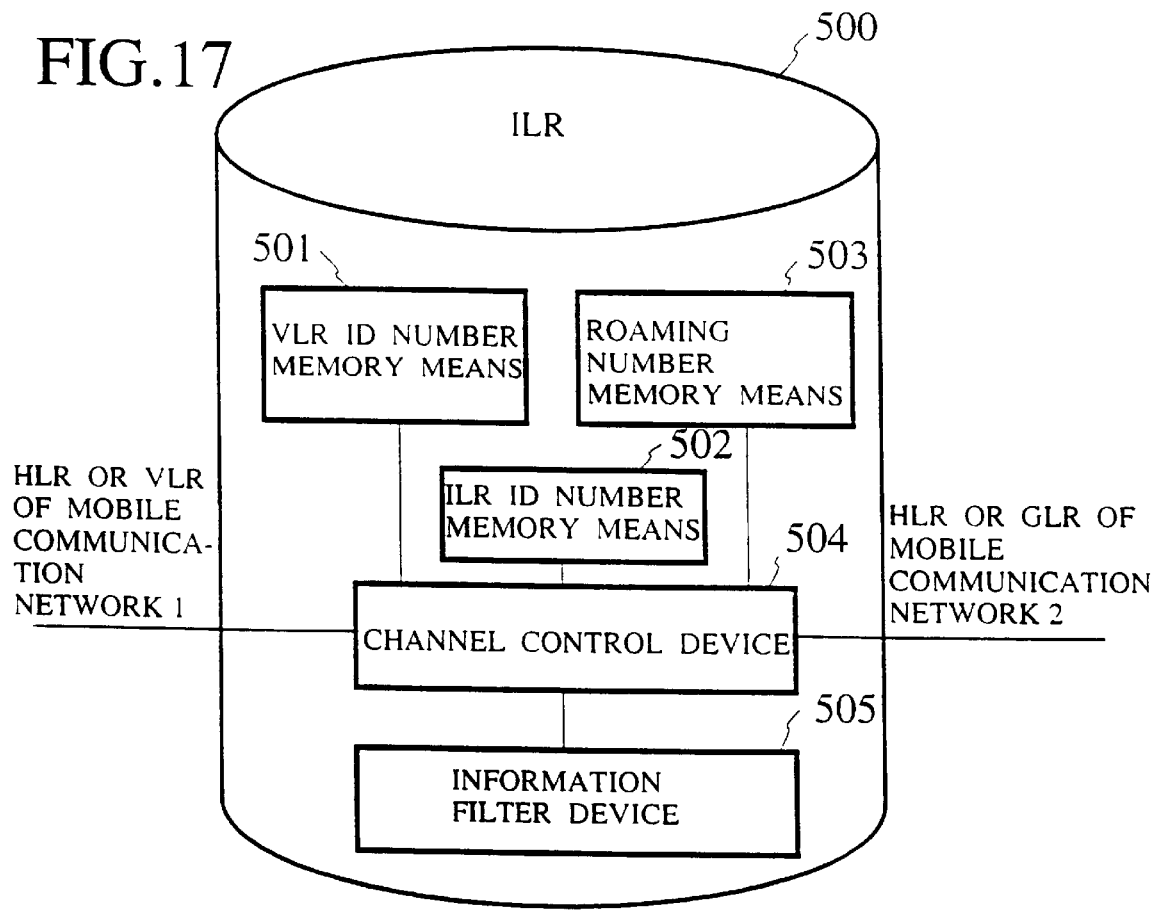

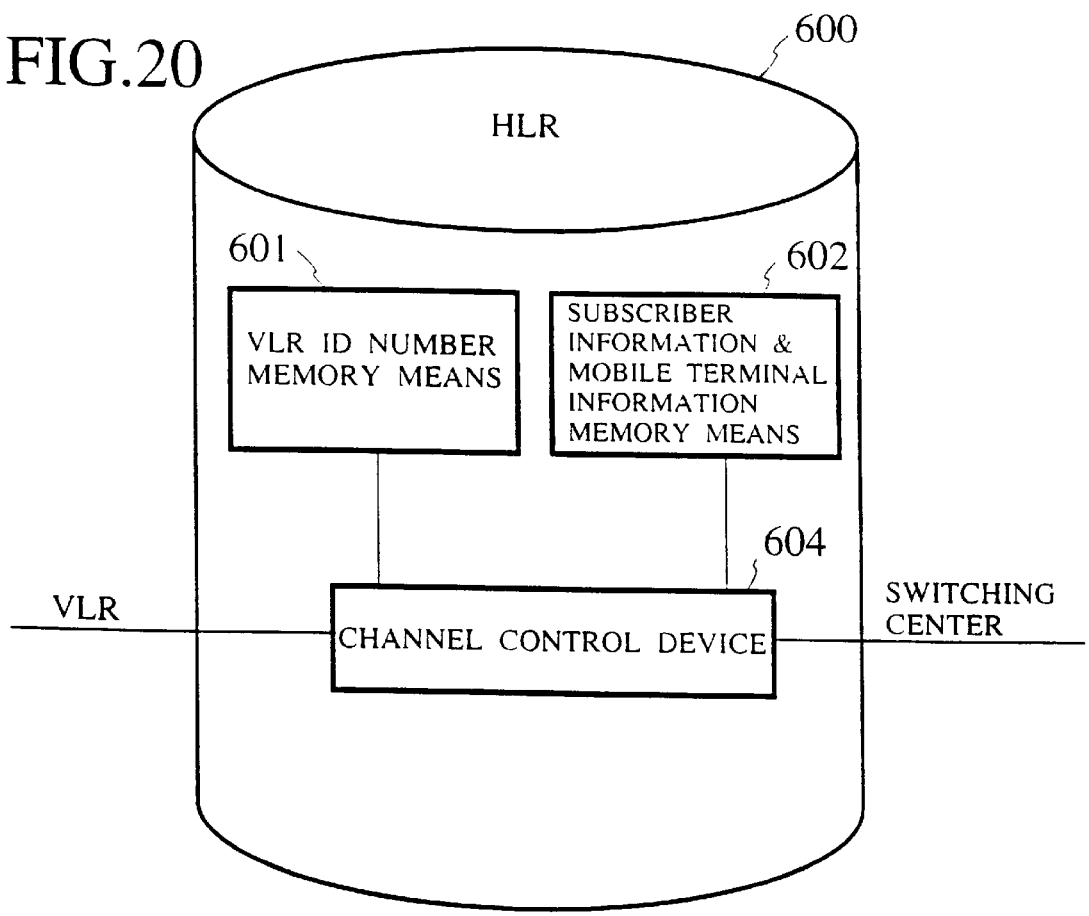

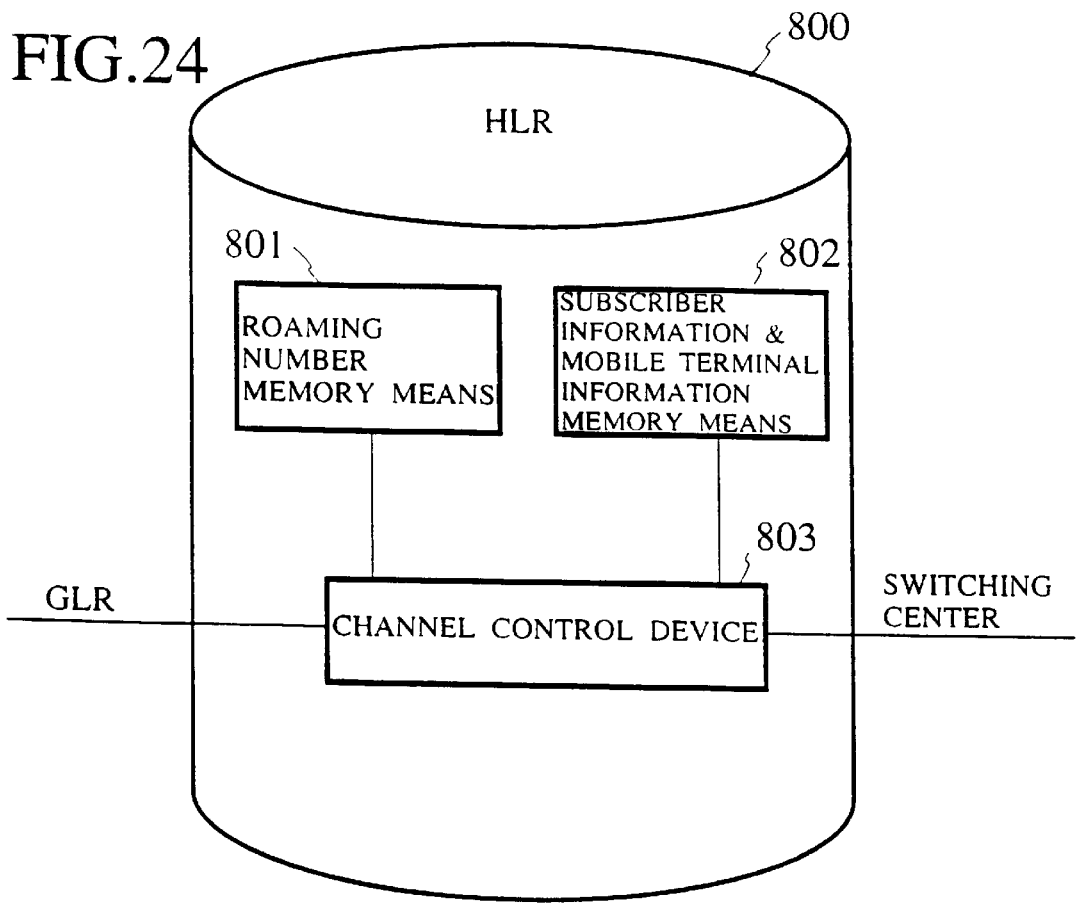

ROAMING MOBILE COMMUNICATION SYSTEM AND METHOD

TECHNICAL FIELD

The present invention relates to roaming mobile communication system and method for carrying out a roaming operation between mobile communication networks.

BACKGROUND ART

In mobile communication which is becoming widely used in recent years, communication schemes with different systems are adopted by a plurality of communication business companies, such as an NTT scheme, J-TACS scheme, N-TACS scheme, GSM scheme, PDC scheme, etc. Then, when a mobile subscriber moves to another business company's service area, the so called roaming operation is provided as a service for enabling calling and call receiving from that service area using a different system.

For this roaming which enables the call termination connection regardless of where the mobile subscriber is located, the following two schemes are conventionally known. Namely, a scheme in which a visited location register of a visited network temporarily allocates a roaming number at a time of call termination connection, and a scheme in which a gateway location register of a visited network allocates a roaming number at a time of position registration.

First, the former one of the conventionally known schemes described above, that is a scheme in which a visited location register of a visited network temporarily allocates a roaming number at a time of call termination connection, will be described. In order to describe this scheme, a configuration of a mobile communication system is shown in FIG. 1, and its control methods are shown in FIG. 2 and FIG. 3. In each of these figures, VMSC (Visited Mobile Switching Center) is a visited mobile switching center, VLR (Visited Location Register) is a visited location register, HLR (Home Location Register) is a home location register, and GMSC (Gateway Mobile Switching Center) is a gateway mobile switching center. Also, a solid line indicates a communication channel, and a dashed line indicates a control channel.

As shown in FIG. 2, when a mobile subscriber moves (1) to a control area of some visited mobile switching center VMSC2, a position registration request (2) is made with respect to the visited mobile switching center VMSC2. When the position registration request (2) is received, the visited mobile switching center VMSC2 carries out a position registration request (3) with respect to a visited location register VLR2. When the position registration request (3) is received, the visited location register VLR2 normally searches an information of that mobile subscriber and updates a position information. However, the visited location register VLR2 does not store an information of a subscriber who requested the position registration for the first time, so that a region for storing an information of that subscriber is secured, and a position information of that subscriber is stored. In addition, the visited location register VLR2 notifies (4) an ID number of the visited mobile switching center VMSC2 and an ID number of the visited location register VLR2 to a home location register HLR which constantly stores the subscriber information of that subscriber. The home location register HLR stores (5) these visited mobile switching center ID number and visited location register ID number.

Next, when a received call for the mobile subscriber occurs, as shown in FIG. 3, this received call is routed as an IAM (Initial Address Message) to a gateway mobile switching center GMSC of the mobile communication network to which this subscriber is subscribing, according to the subscriber number of that subscriber. The gateway mobile switching center GMSC requests (2) an information for routing the received call to that mobile subscriber, with respect to the home location register HLR. When the routing information request (2) from the gateway mobile switching center GMSC is received, the home location register HLR searches an information of that subscriber, and learns the ID number of the visited mobile switching center VMSC2 and the ID number of the visited location register VLR2. In addition, the home location register HLR requests (3) an allocation of a roaming number for the purpose of routing the received call of that subscriber to the visited mobile switching center, with respect to the visited location register VLR2. When the roaming number allocation request (3) is received, the visited location register VLR2 temporarily allocates (4) a roaming number to that subscriber, and returns (5) it to the home location register HLR. The home location register HLR notifies (6) the roaming number to the gateway mobile switching center GMSC. The gateway mobile switching center GMSC routes (7) the received call as the IAM to the visited mobile switching center VMSC2 according to the roaming number.

Next, the latter one of the conventionally known schemes described above, that is a scheme in which a gateway location register of a visited network allocates a roaming number at a time of position registration, will be described. In order to describe this scheme, a configuration of a mobile communication system is shown in FIG. 4, and its control methods are shown in FIG. 5 and FIG. 6. In each of these figures, GLR (Gateway Location Register) is a gateway location register.

Note that, as long as the mobile subscriber moves within the subscribed mobile communication network, the position information of that subscriber is updated at each home location register HLR. However, in order for the mobile subscriber to make a communication by moving to the not subscribed mobile communication network, it is necessary for the mobile subscriber to make a roaming contract with that mobile communication network in advance.

As shown in FIG. 5, when a mobile subscriber 60 moves (1) to that roaming contracted mobile communication network 11, a position registration request (2) is made with respect to the visited mobile switching center VMSC44 of that mobile communication network 11. When the position registration request (2) is received, the visited mobile switching center VMSC44 carries out a position registration request (3) with respect to a gateway location register GLR31. When the position registration request (3) is received, the gateway location register GLR31 does not store an information of a subscriber who requested the position registration for the first time, so that a region for storing an information of that subscriber is secured, and a roaming number is allocated (4) to that subscriber. In addition, the gateway location register GLR31 notifies (5) the roaming number to a home location register HLR20 which constantly stores the subscriber information of that subscriber, and the home location register HLR20 stores (6) this roaming number.

Next, when a received call for the mobile subscriber 60 occurs, as shown in FIG. 6, this received call is routed (1) as an IAM to a gateway mobile switching center GMSC50 of the mobile communication network 10 to which this subscriber is subscribing, according to the subscriber number of that subscriber. The gateway mobile switching center GMSC50 requests (2) an information for routing the received call to that mobile subscriber 60, with respect to the home location register HLR20.

When the routing information request (2) from the gateway mobile switching center GMSC50 is received, the home location register HLR20 searches an information of that subscriber, and when the roaming number is stored, returns (3) this roaming number to the gateway mobile switching center GMSC50. The gateway mobile switching center GMSC50 routes (4) the received call as the IAM to the gateway mobile switching center GMSC51 of the mobile communication network 11 visited by that subscriber, according to this roaming number. The gateway mobile switching center GMSC51 of the mobile communication network 11 visited by that subscriber requests (5) an information for routing the received call to that mobile subscriber, with respect to the gateway location register GLR31. The gateway location register 31 returns (6) the position information of that subscriber to the gateway mobile switching center GMSC 51. The gateway mobile switching center GMSC51 terminates the call to the mobile subscriber 60 by carrying out the paging according to the received position information.

However, in the conventional schemes described with references to FIG. 1 to FIG. 6 described above, when the mobile subscriber roams between a communication network (FIG. 1 to FIG. 3) adopting a scheme in which a visited location register of a visited network (that is a roaming destination mobile communication network) temporarily allocates a roaming number at a time of call termination connection, and a mobile communication network (FIG. 4 to FIG. 6) adopting a scheme in which a gateway location register of a visited network allocates a roaming number at a time of position registration, because the roaming number allocation schemes are different in these mobile communication networks, there is no method for allocating the roaming number to that mobile subscriber, and as a result, there has been a drawback that the mobile subscriber cannot roam.

On the other hand, the conventional roaming includes a personal roaming which is realized only between the mobile communication networks supporting a personal mobile communication in which a subscriber number assigned to a user and a mobile terminal number assigned to a mobile terminal are arbitrarily set in correspondence.

With reference to FIG. 7, a personal roaming control scheme for carrying out the personal roaming in such personal mobile communication networks will be described.

In FIG. 7, a mobile communication network 411 which is supporting the personal mobile communication scheme has a user home location register HLR-P (Home Location Register for Personal mobility) 412 for holding a subscriber information P-data4 which is identified by a subscriber number PID4, and a mobile terminal home location register (Home Location Register for Terminal mobility) 413 for holding a mobile terminal information T-data4 of a mobile terminal which is identified by a mobile terminal number TID4, while a mobile communication network 111 which is supporting the personal mobile communication scheme has a user gateway location register GLR-P (Gateway Location Register for Personal mobility) 112 for holding a subscriber information R-P-data1 for a roaming user which is identified by a subscriber number PID4, and a mobile terminal home location register (Home Location Register for Terminal mobility) 113 for holding a mobile terminal information T-data1 of a mobile terminal which is identified by a mobile terminal number TID1.

In FIG. 7, when a user of the mobile communication network 411 moves (S31) to the mobile communication network 111, in order to realize the roaming to that mobile communication network 111, it is necessary to notify and register (S32) the subscriber number PID4 and the mobile terminal number TID1 of the mobile terminal 115 to the mobile communication network 111 which is the roaming destination network. Note that, in this case, as a means for enabling the user to notify the subscriber number PID4 to the mobile communication network 111 through the mobile terminal 115, it is possible to consider a method in which the user owns a user device which stores the subscriber number PID4, and the subscriber number PID4 is automatically notified to the mobile communication network 111 when that user device is attached to the mobile terminal 115 of the mobile communication network 111 which is the roaming destination network. Alternatively, as another means, a method in which the user explicitly notifies it to the mobile communication network 111 which is the roaming destination network by using dials, etc. is also possible.

By such means, when the user notifies the subscriber number PID4 and the mobile terminal number TID1 through the mobile terminal 115 to the mobile communication network 111 which is the roaming destination network, a combination of the subscriber number PID4 and the mobile terminal number TID1 is registered (S33) in the user gateway location register 112 of the mobile communication network 111. Then, the user gateway location register 112 inquires (S34) the subscriber information to the user home location register 412 of the mobile communication network 411 which is the user's home network, by using the subscriber number PID4 as a key. In response to this inquiry, the user home location register 412 outputs the subscriber information P-data4, and the mobile communication network 111 registers (S35) that subscriber information P-data4 as the roaming subscriber information R-P-data1 into the user gateway location register 112 in correspondence to the subscriber number PID4.

By the above processing, the subscriber information of the user of the mobile communication network 411 is transferred to the mobile communication network 111, so that it becomes possible for that user to make a call in the mobile communication network 111, and the personal roaming is completed.

In this manner, the personal roaming control can be carried out between the mobile communication networks supporting the personal mobile communication scheme, but in a case where the user's home network does not have a personal mobile communication function, even when the gateway location register GLR-P of the roaming destination network directly inquires the home location register HLR of the user's home network, it is impossible to make a response by taking out only the subscriber information because the subscriber information and the mobile terminal information is integrally provided in that home location register, and there has been a problem that the personal roaming cannot be made.

DISCLOSURE OF THE INVENTION

Therefore, an object of the present invention is to provide a roaming mobile communication system and method for enabling a roaming call termination connection over networks, even when a mobile subscriber roams between communication networks which adopt different roaming number allocation schemes.

Also, another object of the present invention is to provide roaming mobile communication system and method for enabling a personal roaming from a mobile communication network which is not supporting a personal mobile communication to a mobile communication network which is supporting a personal mobile communication.

In the present invention, an interworking location register is provided between a mobile communication network (first mobile communication network) adopting a scheme in which a visited location register of a visited network temporarily allocates a roaming number at a time of call termination connection, and a mobile communication network (second mobile communication network) adopting a scheme in which a gateway location register of a visited network allocates a roaming number at a time of position registration. Then, this interworking location register is connected with a home location register and a visited location register of the first mobile communication network and a home location register and a gateway location register of the second mobile communication network through control channels.

According to one aspect of the present invention, as shown in FIG. 8, in a case where a subscriber of the first mobile communication network roams to the second mobile communication network, when a position registration is made at a visited network, the roaming number RON (ROAMING NUMBER) allocated by the gateway location register GLR of the visited network is stored in the interworking location register ILR, and at a time of call termination for that subscriber, when the home location register HLR of the home network (that is, the mobile communication network to which the mobile subscriber is subscribing) requests the roaming number, the interworking location register ILR returns the roaming number RON, and the call termination connection is made.

Also, according to another aspect of the present invention, as shown in FIG. 9, in a case where a subscriber of the second mobile communication network roams to the first mobile communication network, when a position registration is made at a visited network, the visited location register number of the visited network is stored in the interworking location register ILR while the interworking location register number is stored in the home location register HLR of the home network, and at a time of a call termination for that subscriber, the home location register HLR requests the roaming number to the interworking location register ILR, the interworking location register ILR further requests the roaming number to the visited location register VLR, that visited location register allocates the roaming number MSRN (Mobile Station Roaming Number) and returns that roaming number MSRN, and the call termination is made.

According to each aspect of the present invention as in the above, by providing the interworking location register between a mobile communication network (first mobile communication network) adopting a scheme in which a visited location register of a visited network temporarily allocates a roaming number at a time of call termination connection, and a mobile communication network (second mobile communication network) adopting a scheme in which a gateway location register of a visited network allocates a roaming number at a time of position registration, a roaming call termination connection over networks becomes possible.

Also, according to another aspect of the present invention, in a case of carrying out a personal roaming control between two mobile communication networks, including a first mobile communication network which supports a mobile communication scheme in which a user and a mobile terminal are identified by a subscriber number and a correspondence between a user and a mobile terminal is fixed, and a second mobile communication network which supports a personal mobile communication in which a subscriber number assigned to a user and a mobile terminal number assigned to a mobile terminal are arbitrarily set in correspondence, the second mobile communication network has a mobile terminal home location register for holding a mobile terminal information on a mobile terminal which is identified by a mobile terminal number, and a user gateway location register for holding a subscriber information on a roaming user which is identified by a subscriber number, and the first mobile communication network has a home location register for holding respective information on a user and a mobile terminal which is identified by a subscriber number. The second mobile communication network has information filter means for reading out the subscriber information and the mobile terminal information from the home location register of the first mobile communication network by using the subscriber number of that user as a key, and extracting a subscriber information by filtering only information necessary for roaming from that read out information, and a storing control means for controlling such that the subscriber information extracted by that information filter means is stored in the user gateway location register by using the subscriber number as a key, when a user of the first mobile communication network makes the position registration to the second mobile communication network.

By means of this, when a user of the first mobile communication network which is not supporting the personal mobile communication makes the position registration through a mobile terminal of the second mobile communication network, the second mobile communication network which is supporting the personal mobile communication reads out the subscriber information and the mobile terminal information from the home location register of the first mobile communication network by using that subscriber number as a key, extracts the subscriber information by filtering only information necessary for roaming from that information, and stores this subscriber information in the user gateway location register by using the subscriber number as a key, so that a roaming from the mobile communication network which is not supporting the personal mobile communication to the mobile communication network which is supporting the personal mobile communication becomes possible.

BRIEF DESCRIPTION OF THE DRAWINGS

Figure 6:
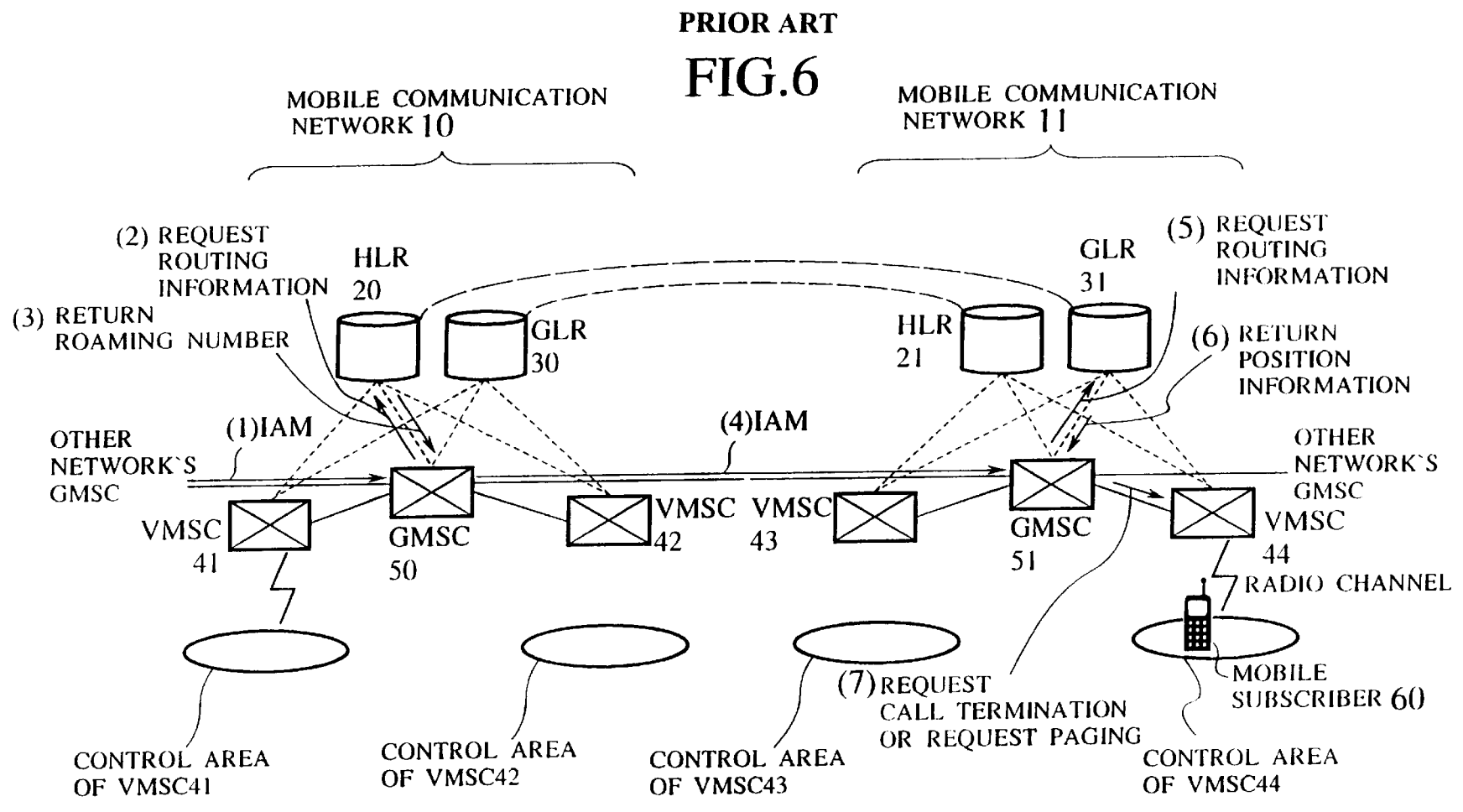

FIG. 6 is a figure showing a conventional call termination control scheme in the mobile communication system of FIG. 4.

FIG. 17 is a schematic block diagram showing an internal configuration of an interworking location register used in the roaming mobile communication system of the present invention.

FIG. 18 is a figure showing data stored by a visited location register ID number memory means of the interworking location register of FIG. 17.

FIG. 19 is a figure showing data stored by a roaming number memory means of the interworking location register of FIG. 17.

FIG. 20 is a schematic block diagram showing an internal configuration of a home location register on a mobile communication network 1 side a part of whose function is to be replaced by the interworking location register of FIG. 17.

FIG. 21 is a figure showing data stored by a VLR ID number memory means of the home location register of FIG. 20.

FIG. 22 is a figure showing data stored by a subscriber information and mobile terminal information memory means of the home location register of FIG. 20.

FIG. 24 is a schematic block diagram showing an internal configuration of a home location register on a mobile communication network 2 side a part of whose function is to be replaced by the interworking location register of FIG. 17.

FIG. 25 is a figure showing data stored by a roaming number memory means of the home location register of FIG. 24.

FIG. 26 is a figure showing data stored by a subscriber information and mobile terminal information memory means of the home location register of FIG. 24.

BEST MODE FOR CARRYING OUT THE INVENTION

In the following, with references to the drawings, embodiments of the present invention will be described in detail.

First, the mobile communication system and method according to the first and second embodiments of the present invention will be described.

Figure 1:
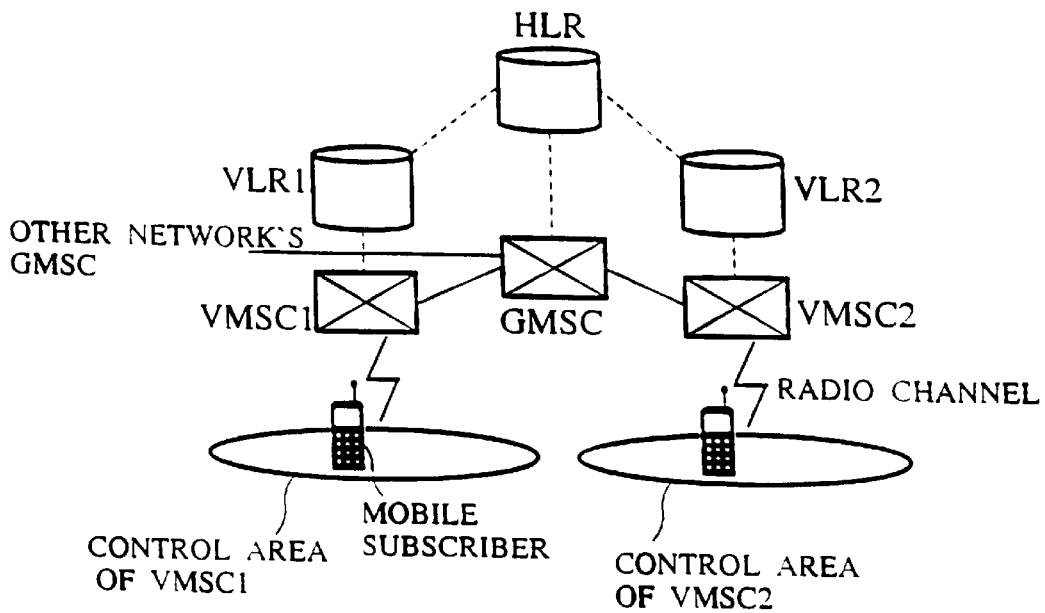
FIG. 1 is a figure showing a schematic configuration of a mobile communication system adopting one example of a conventional roaming number allocation scheme.
Figure 2:
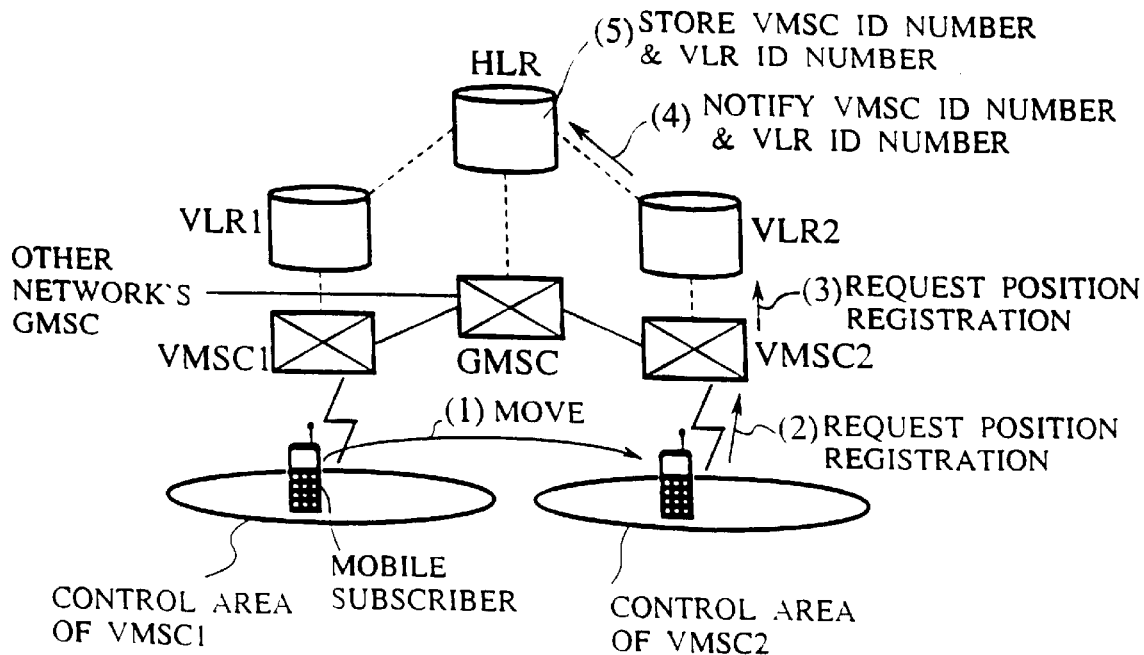
FIG. 2 is a figure showing a conventional position registration control scheme in the mobile communication system of FIG. 1.
Figure 3:
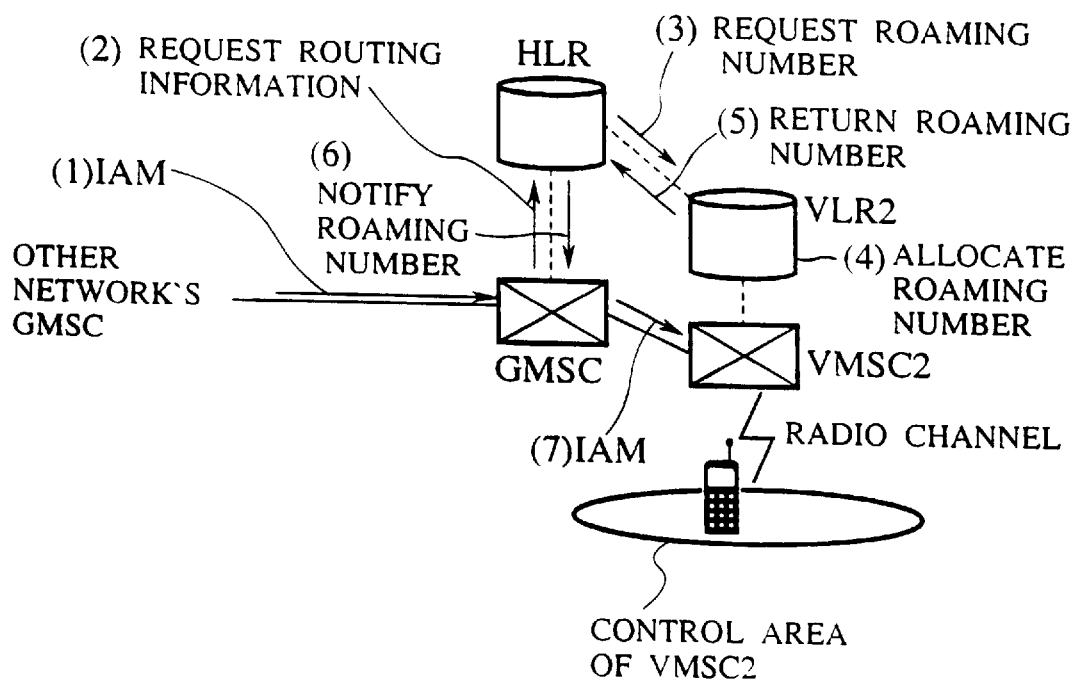
FIG. 3 is a figure showing a conventional call termination control scheme in the mobile communication system of FIG. 1.
Figure 4:
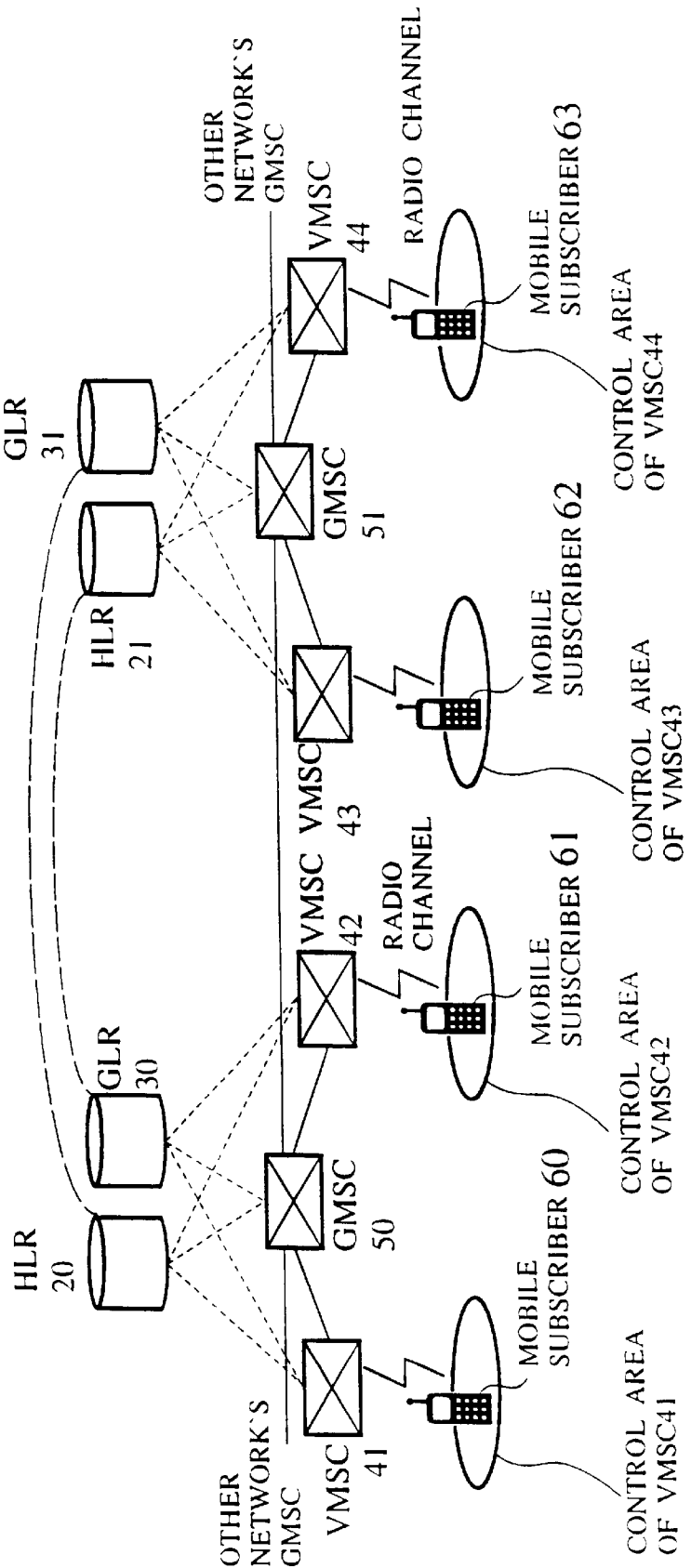
FIG. 4 is a figure showing a schematic configuration of a mobile communication system adopting another example of a conventional roaming number allocation scheme.
Figure 5:
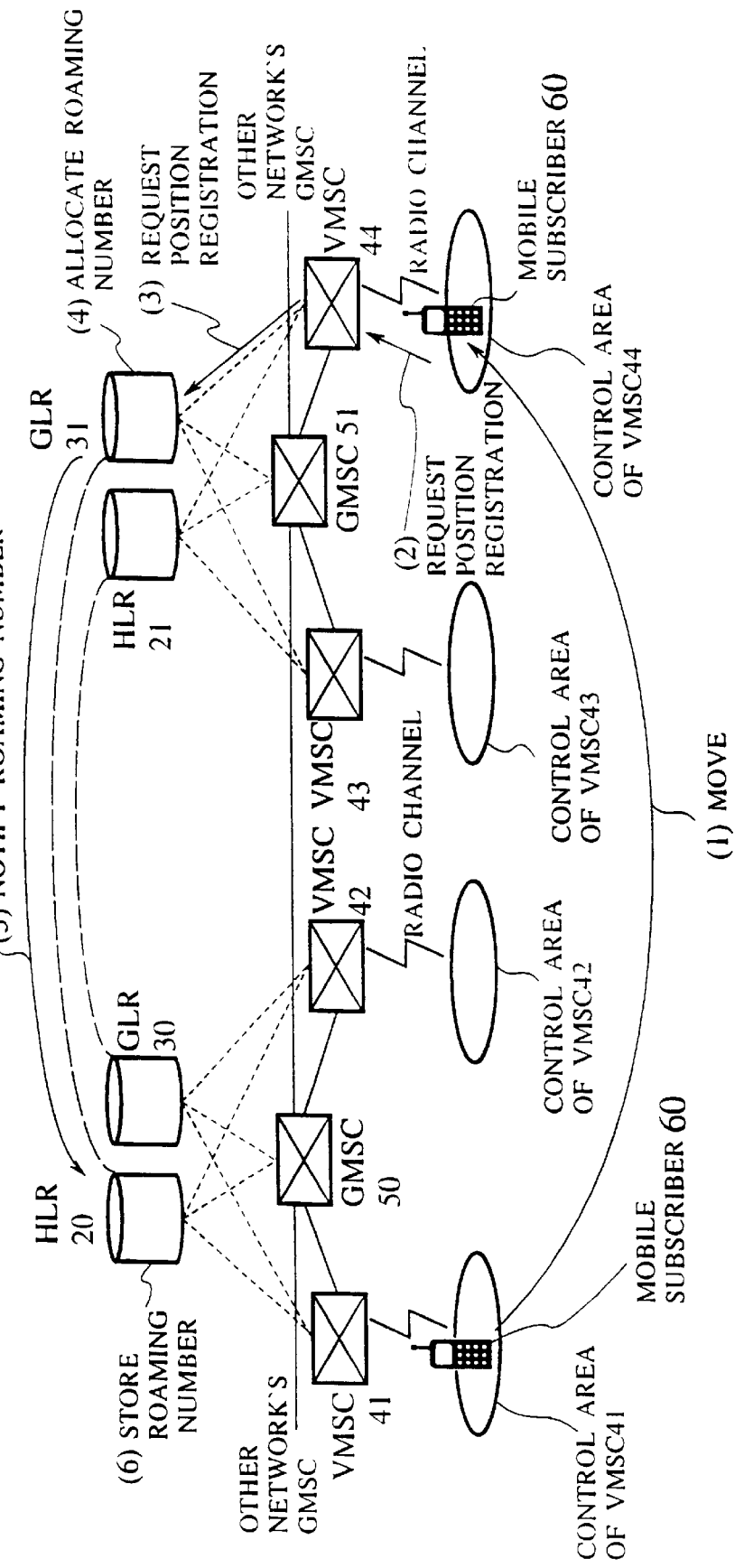
FIG. 5 is a figure showing a conventional position registration control scheme in the mobile communication system of FIG. 4.
Figure 7:
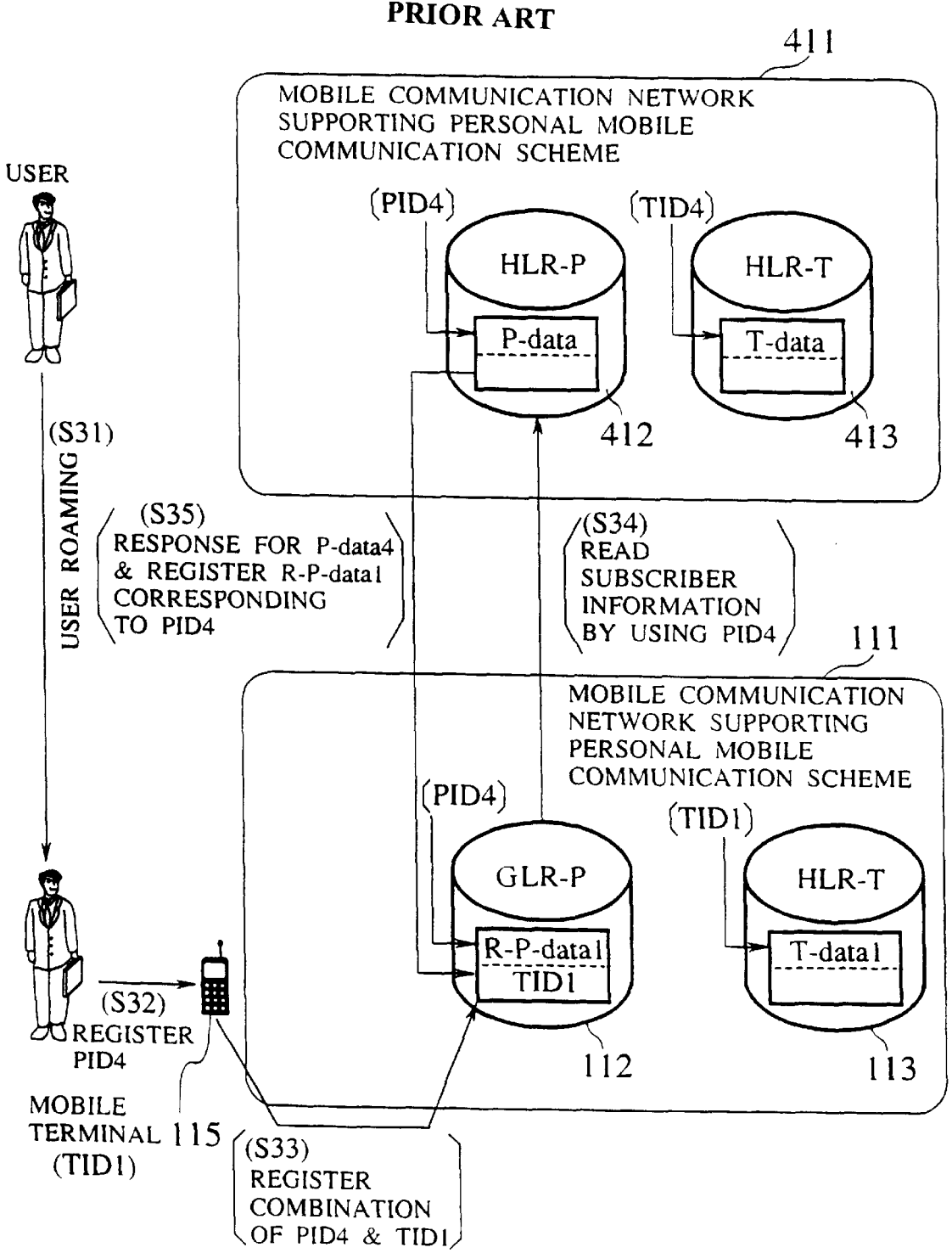
FIG. 7 is a figure showing a personal roaming control scheme between conventional personal mobile communication networks.
Figure 8:
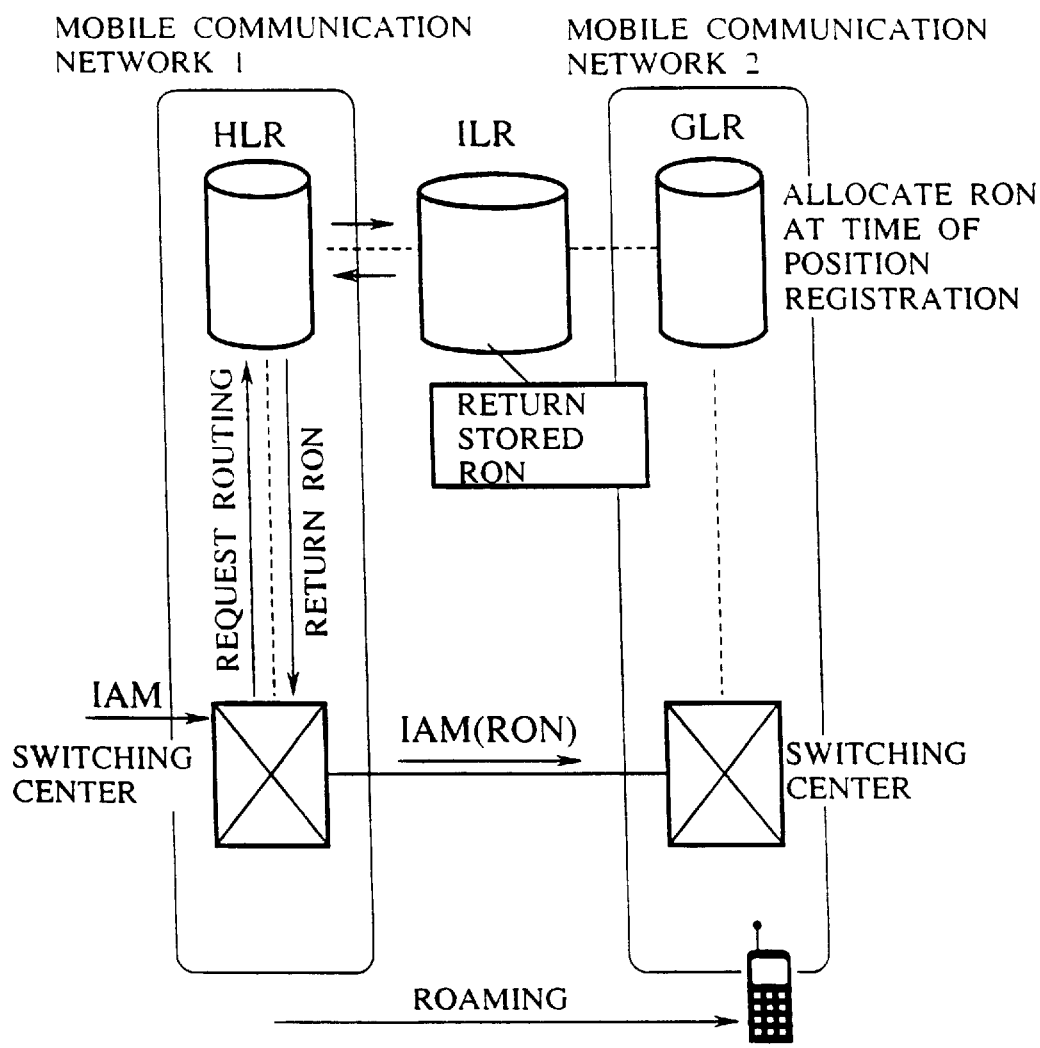
FIG. 8 is a figure showing an outline of a roaming call termination control in one embodiment of a roaming mobile communication method of the present invention.
Figure 9:
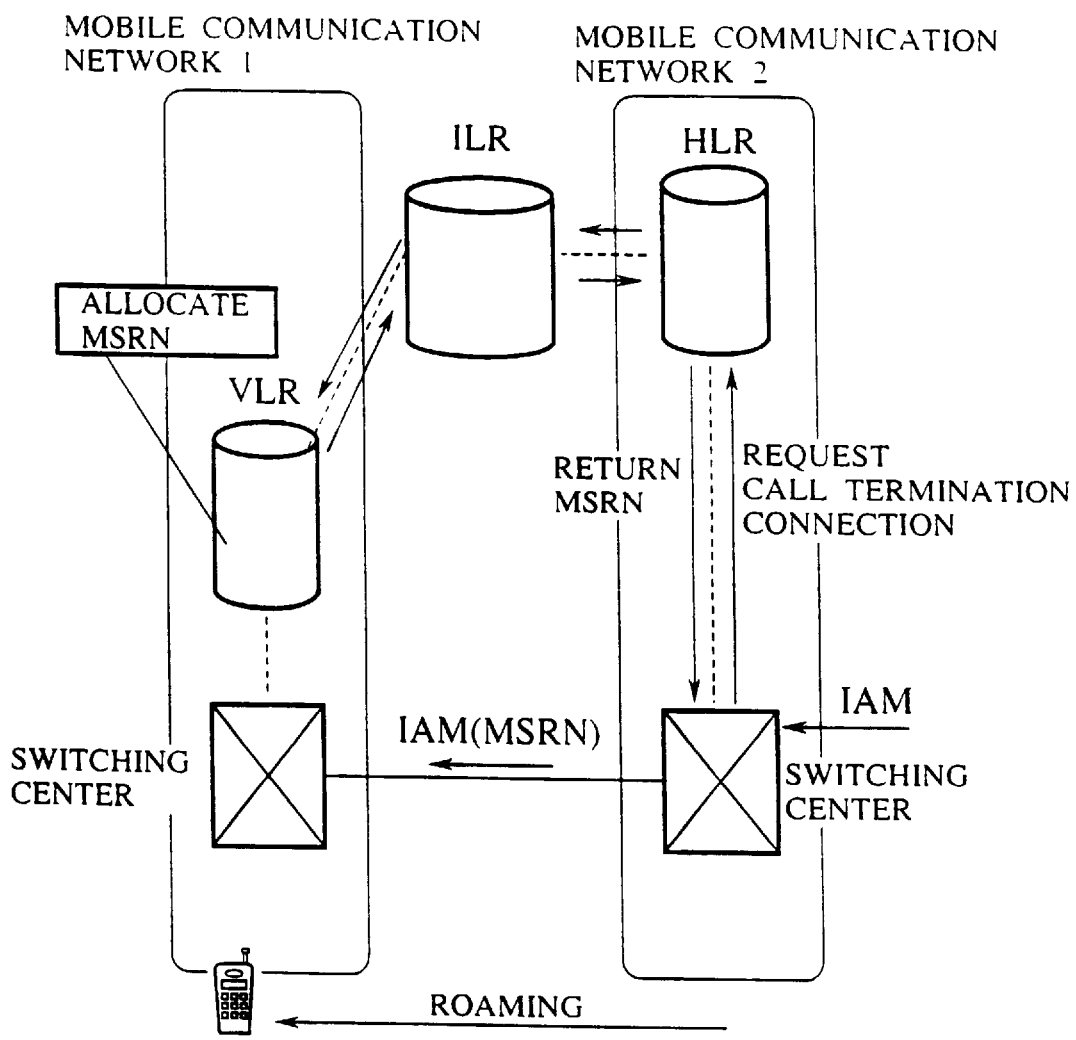
FIG. 9 is a figure showing an outline of a roaming call termination control in another embodiment of a roaming mobile communication method of the present invention.
Figure 10:
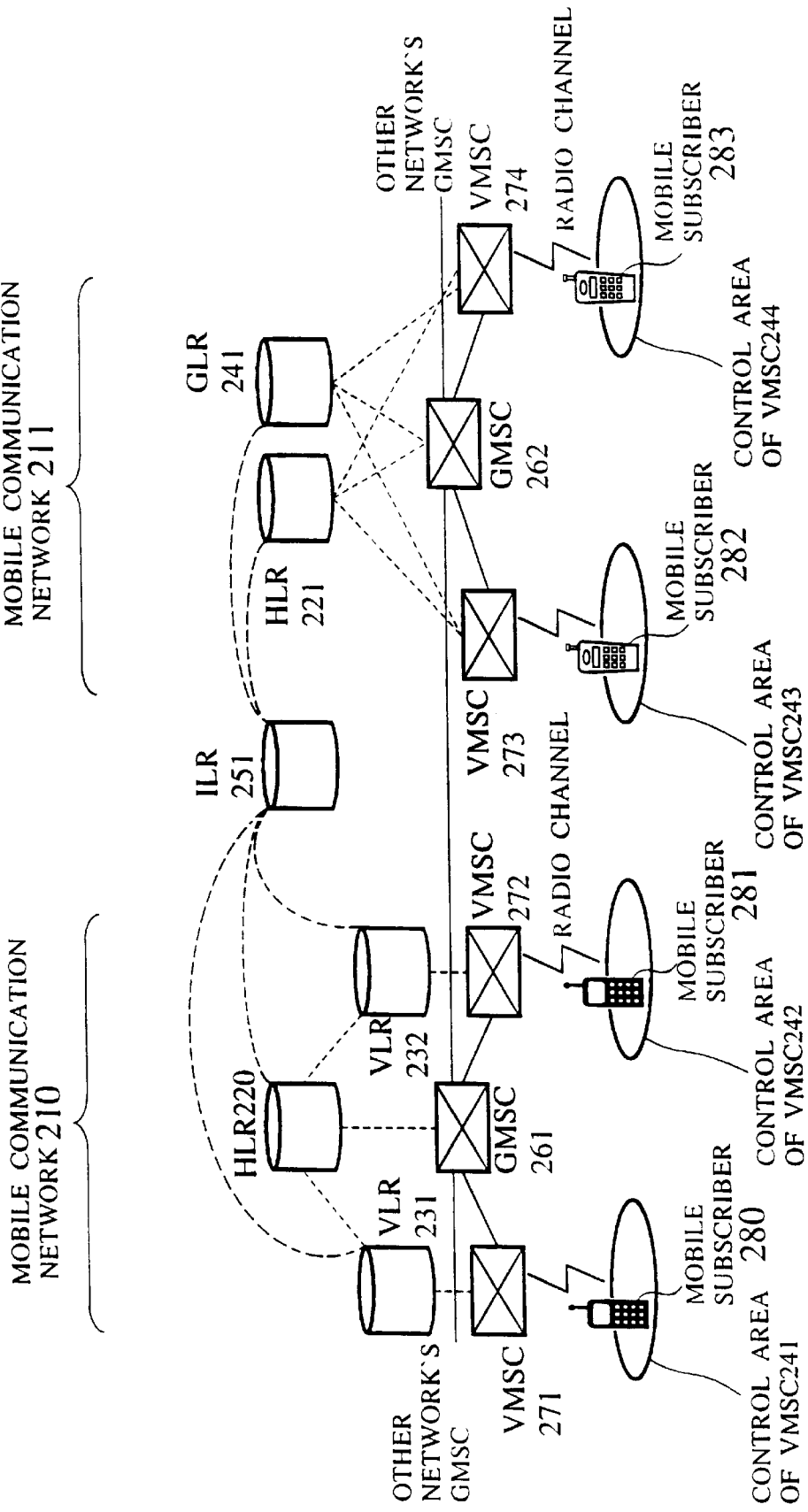
FIG. 10 is a figure showing a schematic configuration of a roaming mobile communication system according to the first and second embodiments of the present invention.

FIG. 10 shows a configuration of a mobile communication system according to the first and second embodiments of the present invention.

In this mobile communication system, a first mobile communication network 210 is a mobile communication network adopting a scheme in which a visited location register of a visited network temporarily allocates a roaming number at a time of call termination connection, and a second mobile communication network 211 is a mobile communication network adopting a scheme in which a gateway location register of a visited network allocates a roaming number at a time of position registration.

In FIG. 10, ILR is an interworking location register which is the feature of the present invention, VMSC is a visited mobile switching center, VLR is a visited located register, HLR is a home location register, GMSC is a gateway mobile switching center, and GLR is a gateway location register. Also, a solid line indicates a communication channel, and a dashed line indicates a control channel.

As shown in FIG. 10, an interworking location register ILR251 is connected with a home location register HLR220 and visited location registers 231 and 232 of the first mobile communication network 210, and with a home location register 221 and a gateway location register GLR241 of the second mobile communication network 211.

Figure 11:
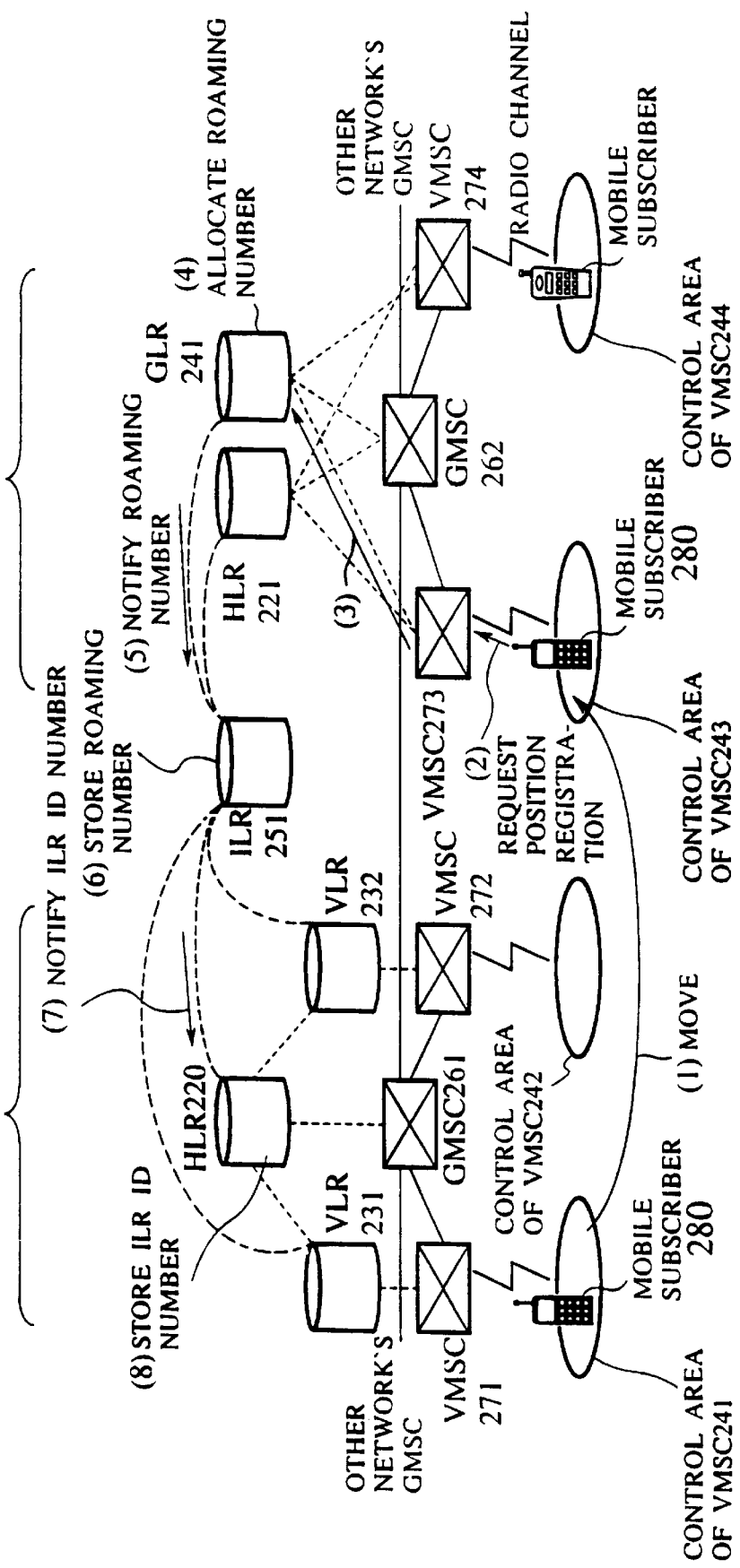
FIG. 11 is a figure showing a position registration control scheme of the first embodiment in the roaming mobile communication system of FIG. 10.

FIG. 11 shows a position registration scheme and a call termination scheme of the first embodiment in the mobile communication system shown in FIG. 10.

As shown in FIG. 11, when a mobile subscriber 280 of the first mobile communication network 210 moves to the roaming contracted second mobile communication network 211, at the visited network (that is, the second mobile communication network 211), the mobile subscriber carries out a roaming position registration for notifying to the mobile communication network the fact that this mobile subscriber himself has moved in. Namely, when the mobile subscriber 280 moves (1) to the roaming contracted mobile communication network 211, a position registration request (2) is made with respect to a visited mobile switching center VMSC273 of that mobile communication network. When the position registration request (2) is received, the visited mobile switching center VMSC273 carries out a position registration request (3) with respect to a gateway location register GLR241. When the position registration request (3) is received, the gateway location register GLR241 does not store an information of a subscriber who requested the position registration for the first time, so that a region for storing an information of that subscriber is secured, and a roaming number is allocated (4) to that subscriber.

In addition, the gateway location register GLR241 notifies (5) this roaming number to the interworking location register ILR251. The interworking location register ILR251 stores (6) this roaming number, while notifying (7) its own (that is, the interworking location register ILR251's) ID number to a home location register HLR220 of the first mobile communication network 210 which constantly stores a subscriber information of that subscriber. Then, the home location register HLR220 stores (8) the notified ID number of the interworking location register ILR251 as an ID number of a visited location register for this subscriber.

Figure 12:
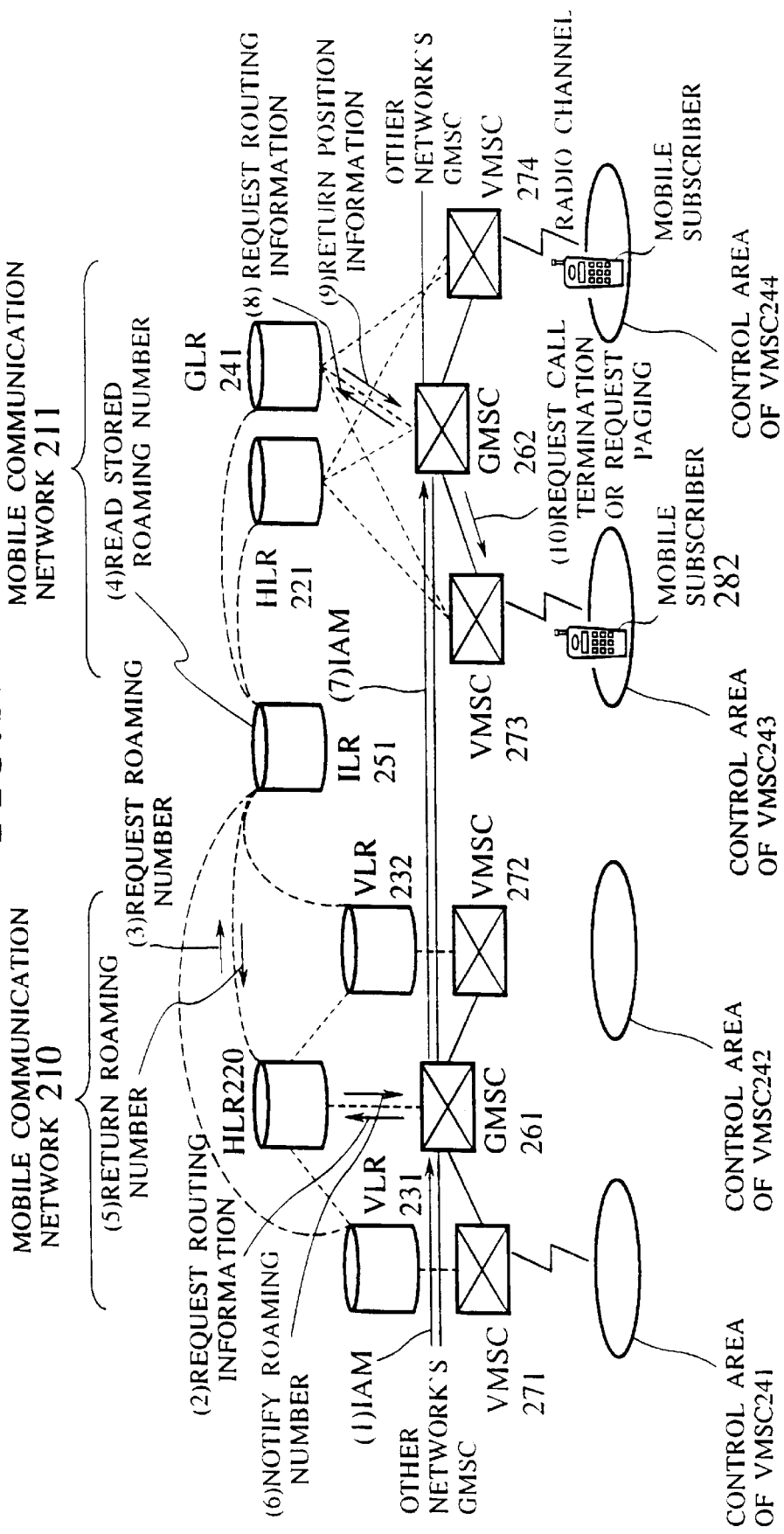
FIG. 12 is a figure showing a call termination control scheme of the first embodiment in the roaming mobile communication system of FIG. 10.

Next, a call termination control in a case where a received call occurred for the mobile subscriber 280 of the first mobile communication network 210 who is roaming to the second mobile communication network 211 will be described with reference to FIG. 12.

In this case, first, according to the subscriber number of that subscriber, the received call is routed (1) as an IAM to a gateway mobile switching center GMSC261 of the first mobile communication network 210 to which that subscriber is subscribing. The gateway mobile switching center GMSC261 requests (2) an information for routing the received call of that mobile subscriber, with respect to the home location register HLR220 of the first mobile communication network 210. When the routing information request (2) from the gateway mobile switching center GMSC261 is received, that home location register HLR220 searches an information of that subscriber, and learns an ID number of the visited location register for that subscriber. In this example, the ID number of the visited location register is an ID number of the interworking location register ILR251.

In addition, the home location register HLR220 requests (3) an allocation of a roaming number for the purpose of routing the received call of that subscriber to a switching center of the mobile communication station visited by that subscriber, with respect to that visited location register (that is, the interworking location register ILR251). When the roaming number allocation request is received, the interworking location register ILR251 already stores the roaming number for that subscriber (4), so that it returns (5) that stored roaming number to the home location register HLR220.

As the home location register HLR220 notifies (6) that roaming number to the gateway mobile switching center GMSC261, and the gateway mobile switching center GMSC261 routes (7) the received call as an IAM according to that roaming number, that received call reaches to a gateway mobile switching center GMSC262 of the mobile communication network visited by that subscriber.

The gateway mobile switching center GMSC262 requests (8) an information for the purpose of routing the received call of that mobile subscriber 280 to the visited mobile switching center, with respect to a gateway location register GLR241. When the routing information request (8) from the gateway mobile switching center GMSC262 is received, the gateway location register GLR241 searches an information of that subscriber, and returns (9) a position information of that subscriber to the gateway mobile switching center GMSC262. The gateway mobile switching center GMSC262 terminates the call (10) to the mobile subscriber 280 by carrying out the paging according to the received position information.

In this first embodiment, the interworking location register ILR251 operates as a visited location register from a viewpoint of the first mobile communication network 210, and as a home location register from a viewpoint of the second mobile communication network 211, but it is actually the interworking location register ILR251.

Figure 13:
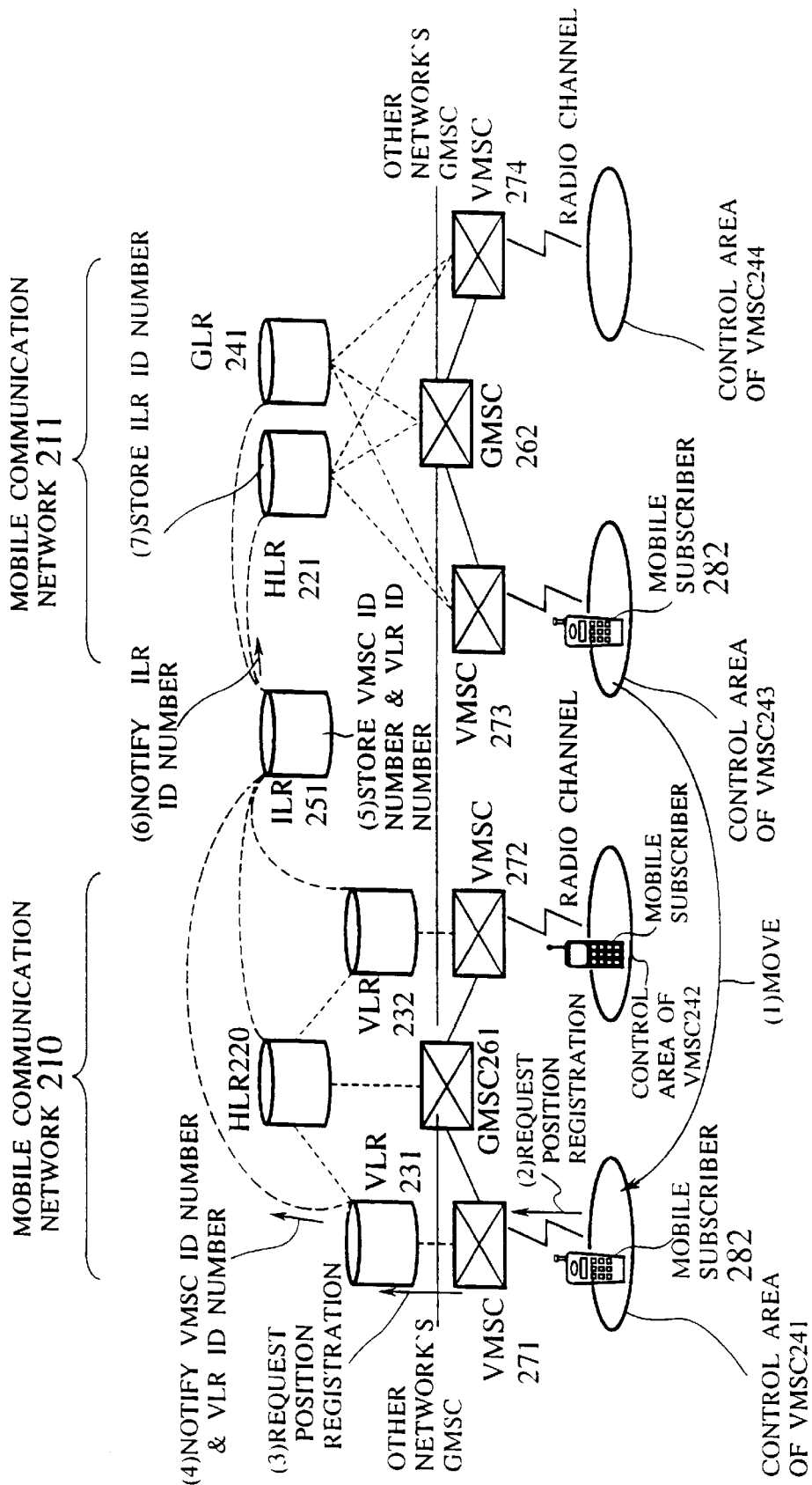
FIG. 13 is a figure showing a position registration control scheme of the second embodiment in the roaming mobile communication system of FIG. 10.
Figure 14:
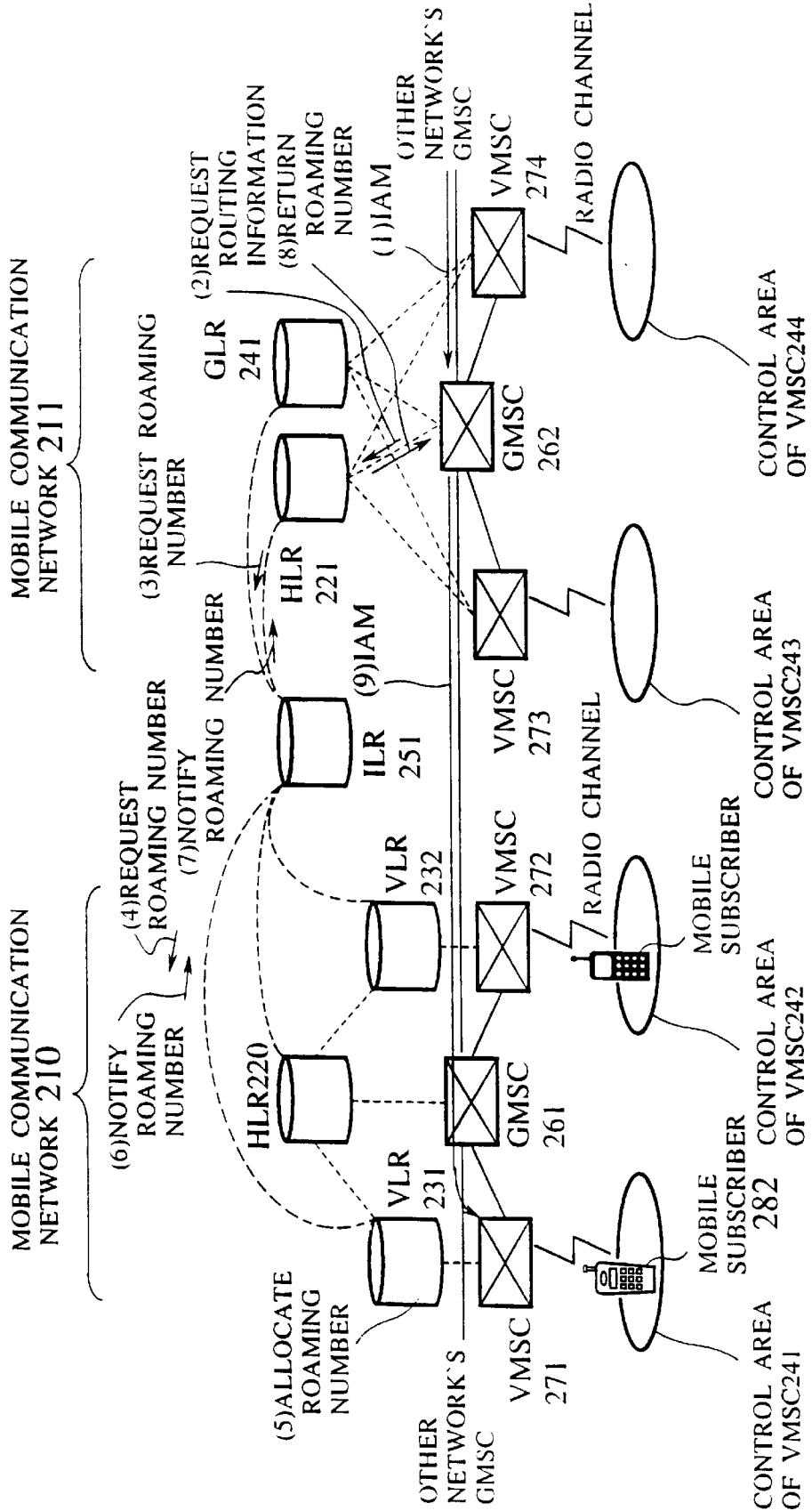
FIG. 14 is a figure showing a call termination control scheme of the second embodiment in the roaming mobile communication system of FIG. 10.

Next, FIG. 13 shows a position registration control scheme of the second embodiment in the mobile communication system shown in FIG. 10, and FIG. 14 shows a call termination control scheme of the second embodiment in the mobile communication system shown in FIG. 10.

As shown in FIG. 13, when a mobile subscriber 282 of the second mobile communication network 211 moves to the roaming contracted first mobile communication network 210, at the visited network (that is, the first mobile communication network 210), the mobile subscriber 282 carries out a roaming position registration for notifying to the mobile communication network the fact that this mobile subscriber himself has moved in. Namely, when the mobile subscriber 282 moves (1) to the roaming contracted mobile communication network 210, a position registration request (2) is made with respect to a visited mobile switching center VMSC271 of that mobile communication network. When the position registration request (2) is received, the visited mobile switching center VMSC271 carries out a position registration request (3) with respect to a visited location register VLR231.

When the position registration request (3) is received, the visited location register VLR231 does not store an information of a subscriber who requested the position registration for the first time, so that a region for storing an information of that subscriber is secured, and a position information of that subscriber is stored. In addition, the visited location register VLR231 notifies (4) an ID number of a visited mobile switching center and an ID number of a visited location register to the interworking location register ILR251.

The interworking location register ILR251 stores (5) an ID number of a visited mobile switching center and an ID number of a visited location register, and in addition, notifies (6) that this subscriber is roaming to the first mobile communication network 210, by storing in correspondence to that subscriber number the fact that it is roaming to the first mobile communication network 210, and notifying its own ID number with respect to the home location register 221 of the second mobile communication network 211. The home location register HLR221 of the second mobile communication network 211 stores (7) the fact that this subscriber is roaming to the first mobile communication network 210, by storing an ID number of the interworking location register.

Next, a call termination control in a case where a received call occurred for the mobile subscriber 282 of the second mobile communication network 211 who is roaming to the first mobile communication network 210 will be described with reference to FIG. 14.

In this case, first, according to the subscriber number of that subscriber, the received call is routed (1) as an IAM to a gateway mobile switching center GMSC262 of the second mobile communication network 211 to which that subscriber is subscribing. The gateway mobile switching center GMSC262 requests (2) an information for routing the received call of that mobile subscriber, with respect to the home location register HLR221 of the second mobile communication network 211.

When the routing information request (2) from the gateway mobile switching center GMSC262 is received, that home location register HLR221 searches an information of that subscriber, and learns that it is roaming to the first mobile communication network 210. In addition, the home location register HLR221 requests (3) an allocation of a roaming number for the purpose of routing the received call of that subscriber to a switching center of the mobile communication station visited by that subscriber, with respect to the interworking location register ILR251.

When the roaming number allocation request (3) is received, the interworking location register ILR251 makes a roaming number request (4) with respect to the visited location register VLR231 of the first mobile communication network 210. Then, this visited location register VLR231 temporarily allocates (5) a roaming number to that subscriber, and notifies (6) this roaming number to the interworking location register ILR251.

The interworking location register ILR251 notifies (7) the notified roaming number to the home location register HLR221 of the second mobile communication network 211, and in addition, this home location register HLR221 notifies (8) this roaming number to the gateway mobile switching center GMSC262. The gateway mobile switching center GMSC262 routes the received call as an IAM according to that roaming number, and this reaches (9) to a visited mobile switching center VMSC271 for that subscriber.

In this second embodiment, the interworking location register ILR251 operates as a home location register from a viewpoint of the first mobile communication network 210, and as a gateway location register from a viewpoint of the second mobile communication network 211, but it is actually the interworking location register ILR251.

As described, according to the first and second embodiments of the present invention, the roaming call termination connection over networks becomes possible, even between the mobile communication networks adopting different roaming number allocation schemes.

Next, the mobile communication system and method according to the third embodiment of the present invention concerning a personal roaming will be described.

Figure 15:
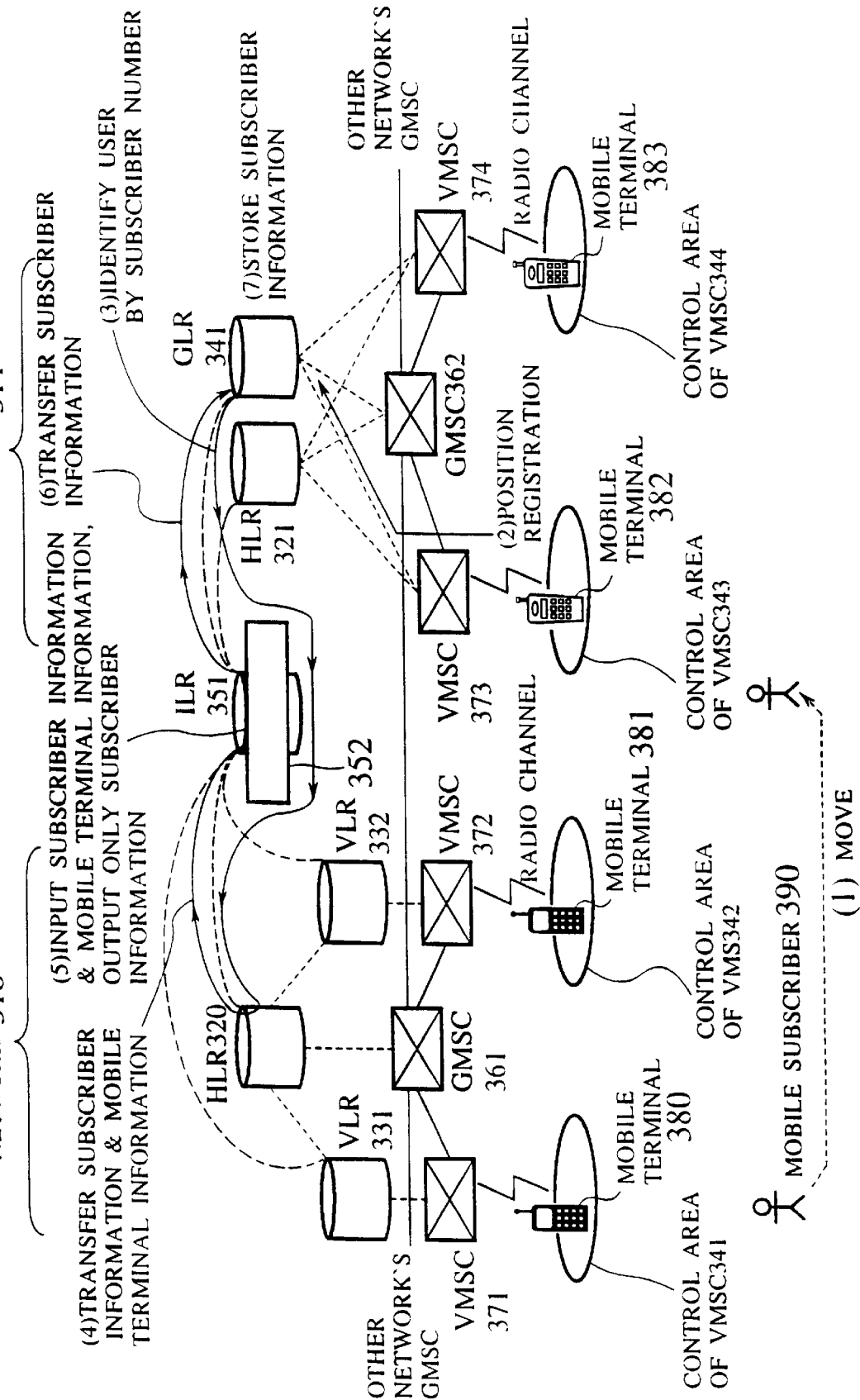
FIG. 15 is a figure showing a schematic configuration of a roaming mobile communication system according to the third embodiment of the present invention.

FIG. 15 shows a configuration of a mobile communication system according to the third embodiment of the present invention.

In this mobile communication system, a first mobile communication network 310 is a mobile communication network which does not support the personal mobile communication scheme, and a second mobile communication network 311 is a mobile communication network which supports the personal mobile communication scheme, where the personal roaming becomes possible as a user 390 of the first mobile communication network 310 roams to the second mobile communication network 311, and carries out a personal roaming registration to the second mobile communication network 311 from a mobile terminal 382 of the second mobile communication network 311.

In FIG. 15, ILR is an interworking location register which is the feature of the present invention, VMSC is a visited mobile switching center, VLR is a visited located register, HLR is a home location register, GMSC is a gateway mobile switching center, and GLR is a gateway location register. Also, a solid line indicates a communication channel, and a dashed line indicates a control channel.

As shown in FIG. 15, an interworking location register ILR351 has an information filter device 352, and is connected with a home location register HLR320 and visited location registers 331 and 332 of the first mobile communication network 310, and with a home location register 321 and a gateway location register GLR341 of the second mobile communication network 311.

Next, with reference to FIG. 16 which shows a main portion of this mobile communication system, a personal roaming control scheme in the third embodiment of the present invention will be described.

Figure 16:
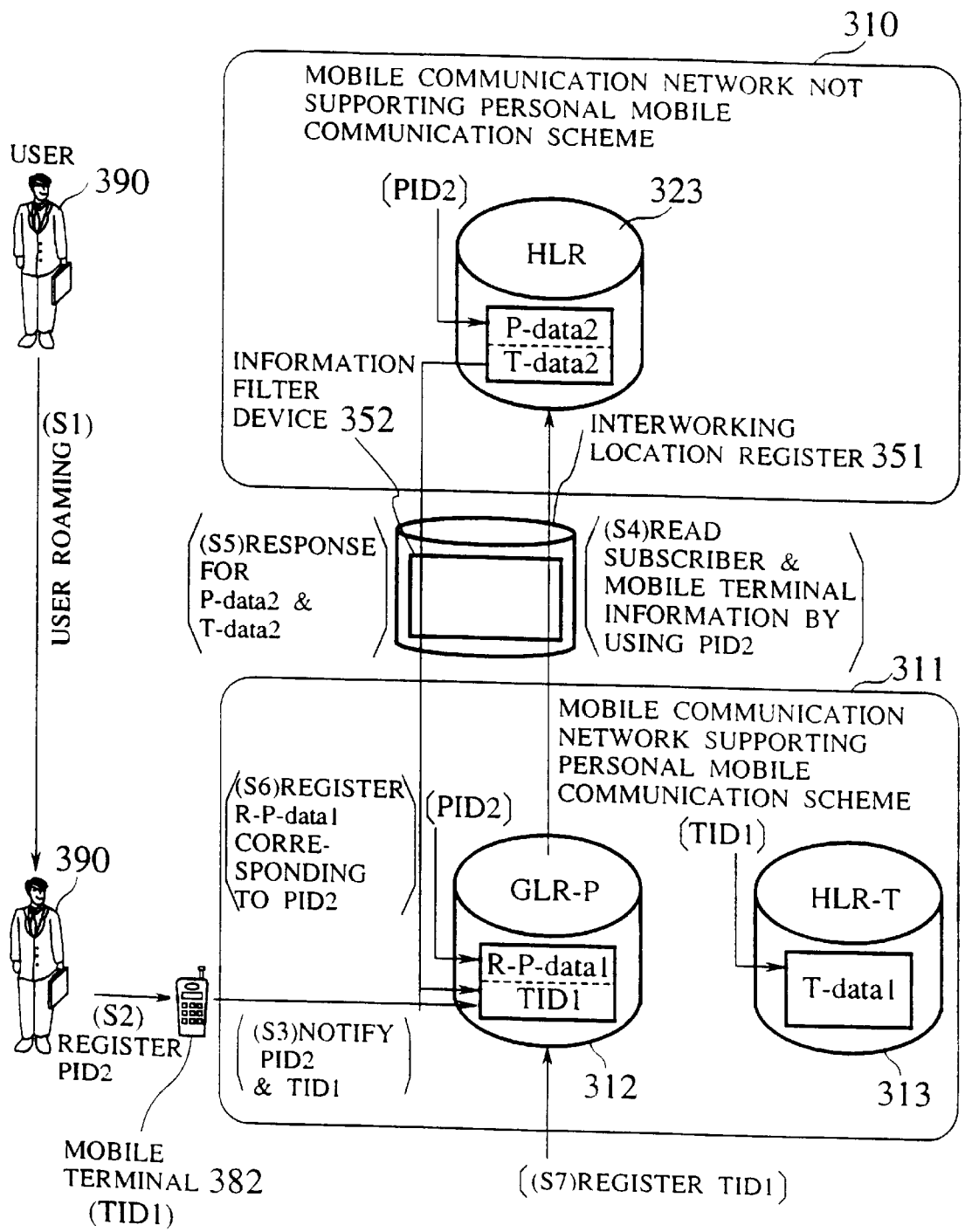
FIG. 16 is a figure showing a personal roaming control scheme of the third embodiment in the roaming mobile communication system of FIG. 15.

In FIG. 16, the second mobile communication network 311 which supports the personal mobile communication scheme is capable of setting a subscriber number assigned to a user and a mobile terminal number assigned to a mobile terminal in correspondence arbitrarily, and has a user gateway location register GLR-P (Gateway Location Register for Personal mobility) 312 for temporarily and separately holding a plurality of subscriber information R-P-data of roaming users which are identified by subscriber numbers PID, and a mobile terminal home location register HLR-T (Home Location Register for Terminal mobility) 313 for permanently and separately holding a mobile terminal information T-data of a mobile terminal which is identified by a mobile terminal number TID.

Also, the first mobile communication network 310 which does not support the personal mobile communication scheme is a mobile communication network which supports a mobile communication scheme in which a user and a mobile terminal are integrally identified by a subscriber number and a correspondence between a user and a mobile terminal is fixed, and has a home location register HLR (Home Location Register) 323 for permanently and integrally holding a subscriber information P-data and a mobile terminal information T-data which are identified by a subscriber number PID.

In addition, an interworking location register 351 is provided in a middle of the first mobile communication network 310 and the second mobile communication network 311, and this interworking location register ILR351 is connected with the home location register HLR323 of the first mobile communication network 310 and the user gateway location register GLR-P312 of the second mobile communication network 311. Also, this interworking location register ILR351 is equipped with the information filter device 352 in its interior.

Note that, in order for a user 390 of the first mobile communication network 310 to realize the roaming to the second mobile communication network 311, it is necessary to notify and register a subscriber number PID2 of the user 390 and a mobile terminal number TID1 of a mobile terminal 382 to the second mobile communication network 311 which is the roaming destination network. In this case, as a means for enabling the user to notify the subscriber number PID2 to the second mobile communication network 311 through the mobile terminal 382, it is possible to consider a method in which the user owns a user device which stores the subscriber number PID2, and the subscriber number PID2 and the mobile terminal number TID1 of the mobile terminal 382 are automatically notified to the second mobile communication network 311 when that user device is attached to the mobile terminal 382 of the second mobile communication network 311 which is the roaming destination network. Alternatively, as another means, a method in which the user explicitly notifies the subscriber number PID2 to the second mobile communication network 311 which is the roaming destination network by using dials, etc. is also possible.

Next, the operation in this third embodiment will be described, and here, a case in which the user has a user device will be described.

When the user 390 of the first mobile communication network 310 roams (S1) to the second mobile communication network 311, and registers (S2) the subscriber number PID2 of the user 390 by attaching the user device to the mobile terminal 382 of the second mobile communication network 311, the mobile terminal number TID1 of the mobile terminal 382 and the subscriber number PID2 are outputted from this mobile terminal 382, and notified (S3) to the user gateway location register 312 provided in the second mobile communication network 311.

When this notice is received, the user gateway location register 312 sends (S4) the subscriber number PID2 to the home location register 323 of the first mobile communication network 310 through the interworking location register 351, so as to read out the integrated subscriber information and mobile terminal information from the home location register 323 of the first mobile communication network 310. In response to this, the home location register 323 of the first mobile communication network 310 reads out the subscriber information P-data2 and the mobile terminal information T-data2 of the user 390 by using the subscriber number PID2 as a key, and returns (S5) them to the interworking location register 351.

At the interworking location register 351, the subscriber information P-data2 and the mobile terminal information T-data2 from the home location register 323 are inputted into the information filter device 352, and only the subscriber information which is necessary as an information of a roaming user is filtered from these information and extracted as a roaming subscriber information R-P-data1. This extracted roaming subscriber information R-P-data1 is temporarily registered (S6) in the user gateway location register 312 by using the subscriber number PID2 as a key. Also, in addition to this roaming subscriber information R-P-data1, the mobile terminal number TID1 is stored (S7) in the user gateway location register 312.

As a result of such a processing, it becomes possible for the user 390 of the subscriber number PID2 to make a call at the second mobile communication network 311.

As described, according to the third embodiment of the present invention, when the user of the first mobile communication network which does not support the personal mobile communication carries out the position registration through the mobile terminal of the second mobile communication network, the second mobile communication network which supports the personal mobile communication reads out the subscriber information and the mobile terminal information from the home location register of the first mobile communication network by using the subscriber number as a key, extracts the subscriber information by filtering only information necessary for roaming from these information, and stores this information in the user gateway location register by using the subscriber number as a key, while storing the mobile terminal number in correspondence to the subscriber information, so that it becomes possible for the user of the mobile communication network which is not supporting the personal mobile communication to realize the personal roaming to the mobile communication network which is supporting the personal mobile communication.

Next, the internal configuration of the interworking location register in each of the above described embodiments will be described.

As shown in FIG. 17, the interworking location register 500 of the present invention is constructed by connecting a VLR ID number memory means 501, an ILR ID number memory means 502, and a roaming number memory means 503 to a channel control device 504 which is connected with the home location register HLR or the visited location register VLR of the first mobile communication network 1 and the home location register HLR or the gateway location register GLR of the second mobile communication network 2. In addition, in a case of the personal roaming of the third embodiment described above, an information filter device 505 is also connected to the channel control device 504.

In this internal configuration of FIG. 17, the VLR ID number memory means 501 stores the subscriber number and the VLR ID number in correspondence as shown in FIG. 18, and the roaming number memory means 503 stores the subscriber number and the roaming number in correspondence as shown in FIG. 19. Also, the ILR ID number memory means 502 is storing a prescribed ID number of this interworking location register.

Figure 23:
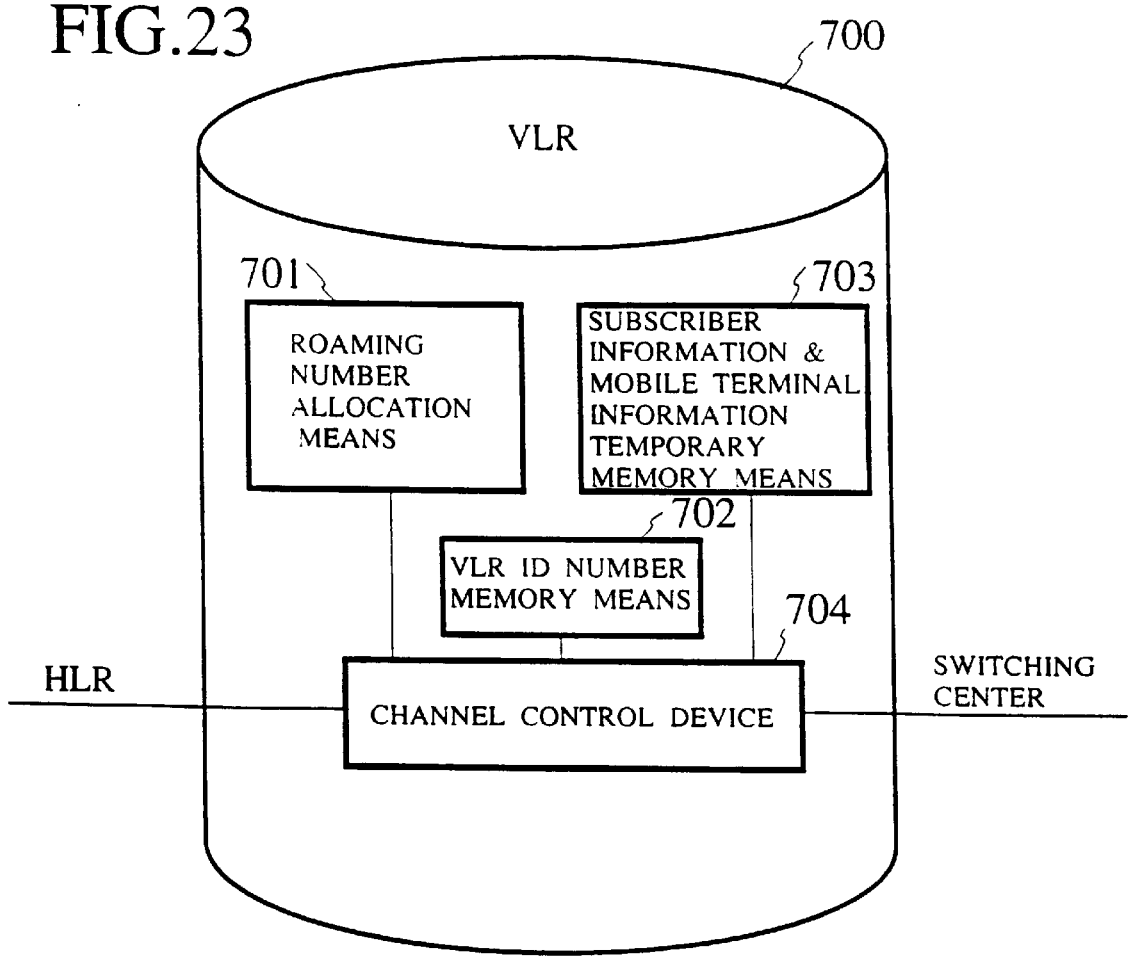
FIG. 23 is a schematic block diagram showing an internal configuration of a visited location register on a mobile communication network 1 side a part of whose function is to be replaced by the interworking location register of FIG. 17.
Figure 27:
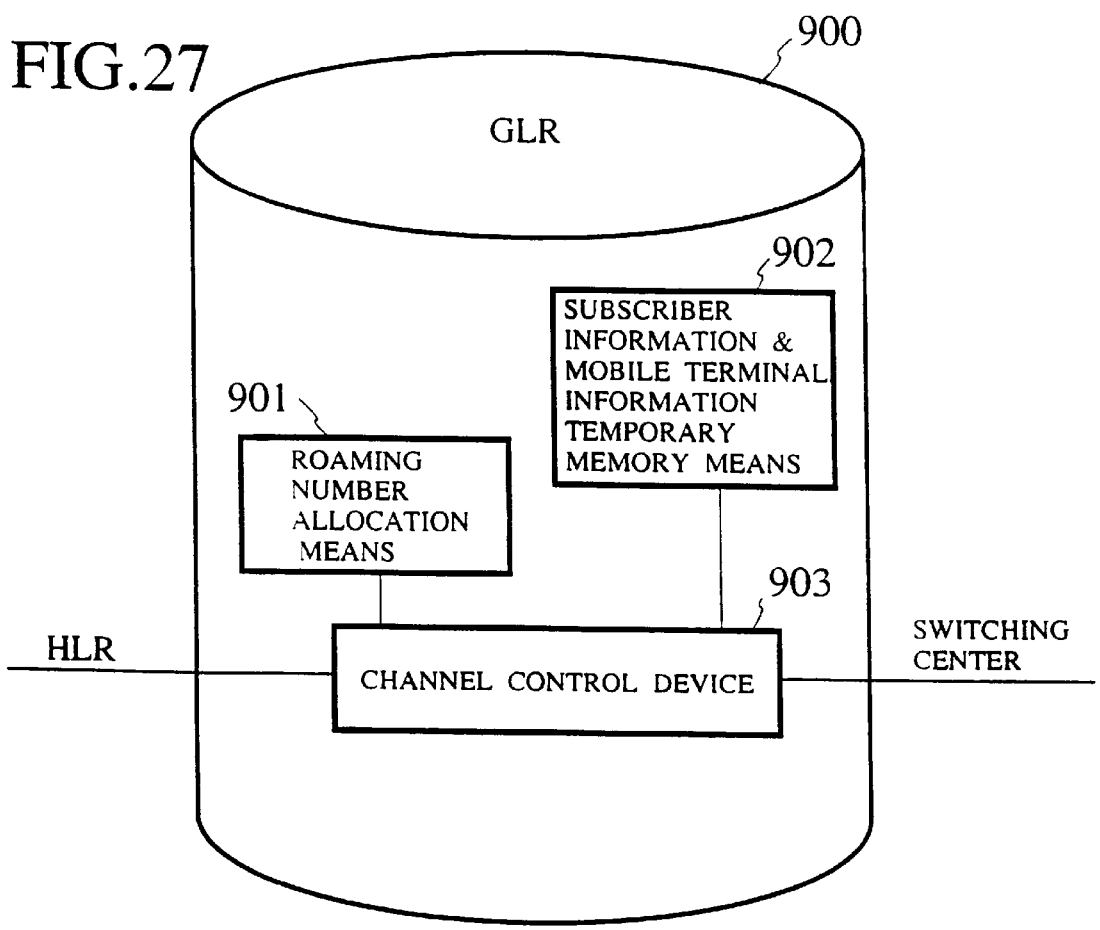
FIG. 27 is a schematic block diagram showing an internal configuration of a gateway location register on a mobile communication network 2 side a part of whose function is to be replaced by the interworking location register of FIG. 17.

This interworking location register 500 operates to replace a part of a function of each of the home location register on the mobile communication network 1 side shown in FIG. 20, the visited location register on the mobile communication network 1 side shown in FIG. 23, the home location register of the mobile communication network 2 side shown in FIG. 24, and the gateway location register of the mobile communication network 2 side shown in FIG. 27, depending on the mobile subscriber of which one of the mobile communication network 1 and the mobile communication network 2 is roaming, and on whether it is viewed from a viewpoint of the mobile communication network 1 or from a viewpoint of the mobile communication network 2.

Here, the home location register 600 shown in FIG. 20 is constructed by connecting a VLR ID number memory means 601 and a subscriber information and mobile terminal information memory means 602 to a channel control device 603 which is connected with the visited location register VLR and the switching center, where the VLR ID number memory means 601 stores the subscriber number and the VLR ID number in correspondence as shown in FIG. 21, and the subscriber information and mobile terminal information memory means 602 stores the subscriber information and the mobile terminal information in correspondence to the subscriber number as shown in FIG. 22.

Also, the visited location register 700 shown in FIG. 23 is constructed by connecting a roaming number allocation means 701, a VLR ID number memory means 702, and a subscriber information and mobile terminal information temporary memory means 703 to a channel control device 704 which is connected with the home location register HLR and the switching center.

On the other hand, the home location register 800 shown in FIG. 24 is constructed by connecting a roaming number memory means 801 and a subscriber information and mobile terminal information memory means 802 to a channel control device 803 which is connected with the gateway location register GLR and the switching center, where the roaming number memory means 801 stores the subscriber number and the roaming number in correspondence as shown in FIG. 25, and the subscriber information and mobile terminal information memory means 802 stores the subscriber information and the mobile terminal information in correspondence to the subscriber number as shown in FIG. 26.

Also, the gateway location register 900 shown in FIG. 27 is constructed by connecting a roaming number allocation means 901 and a subscriber information and mobile terminal information temporary memory means 902 to a channel control device 903 which is connected with the home location register HLR and the switching center.

First, in a case where the mobile subscriber of the mobile communication network 1 roamed to the mobile communication network 2, the interworking location register 500 functions as the visited location register VLR with respect to the mobile communication network 1, and as the home location register HLR with respect to the mobile communication network 2.

Namely, at a time of position registration, at the mobile communication network 1 side, conventionally, the VLR ID number is notified from the VLR ID number memory means 702 of the visited location register 700 of FIG. 23, and this VLR ID number is stored in the VLR ID number memory means 601 of the home location register 600 of FIG. 20, but instead of that, the ILR ID number is notified from the ILR ID number memory means 502 of the interworking location register 500 of FIG. 17, and this ILR ID number is stored as the VLR ID number in the VLR ID number memory means 601 of the home location register 600 of FIG. 20. Also, at the mobile communication network 2 side, conventionally, the roaming number is allocated at the roaming number allocation means 901 of the gateway location register 900 of FIG. 27 and notified in response to the position registration request, and this roaming number is stored in the roaming number memory means 801 of the home location register 800 of FIG. 24, but instead of that, the roaming number is allocated at the roaming number allocation means 901 of the gateway location register 900 of FIG. 27 and notified in response to the position registration request, and this roaming number is stored in the roaming number memory means 503 of the interworking location register 500 of FIG. 17.

After that, at a time of call termination to this mobile subscriber, at the mobile communication network 1 side, conventionally, the roaming number request is issued from the VLR ID number memory means of the home location register 600 of FIG. 20 in response to the routing information request, and upon receiving this, the roaming number is allocated at the roaming number allocation means 701 of the visited location register 700 of FIG. 23 and returned, but instead of that, the roaming number request is issued from the VLR ID number memory means of the home location register 600 of FIG. 20 in response to the routing information request, and upon receiving this, the roaming number stored in the roaming number memory means 503 of the interworking location register of FIG. 17 is read out and returned.

On the other hand, in a case where the mobile subscriber of the mobile communication network 2 roamed to the mobile communication network 1, the interworking location register 500 functions as the home location register HLR with respect to the mobile communication network 1, and as the gateway location register GLR with respect to the mobile communication network 2.

Namely, at a time of position registration, at the mobile communication network 1 side, conventionally, the VLR ID number is notified from the VLR ID number memory means 702 of the visited location register 700 of FIG. 23 in response to the position registration request, and this VLR ID number is stored in the VLR ID number memory means 601 of the home location register 600 of FIG. 20, but instead of that, the VLR ID number is notified from the VLR ID number memory means 702 of the visited location register 700 of FIG. 23 in response to the position registration request, and this VLR ID number is stored in the VLR ID number memory means 501 of the interworking location register 500 of FIG. 17. Also, at the mobile communication network 2 side, conventionally, the roaming number is allocated at the roaming number allocation means 901 of the gateway location register 900 of FIG. 27 and notified, and this roaming number is stored in the roaming number memory means 801 of the home location register 800 of FIG. 24, but instead of that, the ILR ID number is notified from the ILR ID number memory means 502 of the interworking location register 500 of FIG. 17, and this ILR ID number is stored as the roaming number in the roaming number memory means 801 of the home location register 800 of FIG. 24. Note that, at this point, at the roaming number memory means 801 of the home location register 800 of FIG. 24, there is a need to provide a field for indicating whether that roaming number is the ILR ID number or not, for each roaming number, as shown in FIG. 25.

After that, at a time of call termination to this mobile subscriber, at the mobile communication network 1 side, conventionally, the roaming number request is issued from the VLR ID number memory means 601 of the home location register 600 of FIG. 20 in response to the routing information request, and upon receiving this, the roaming number is allocated at the roaming number allocation means 701 of the visited location register 700 of FIG. 23 and returned, and also at the mobile communication 2 side, conventionally, the roaming number is returned from the roaming number memory means 801 of the home location register 800 of FIG. 24 in response to the routing information request, but instead of these, the roaming number request is issued from the roaming number memory means 801 of the home location register 800 of FIG. 24 in response to the routing information request, and upon receiving this, the roaming number request is issued from the VLR ID number memory means 501 of the interworking location register 500 of FIG. 17, the roaming number is allocated at the roaming number allocation means 701 of the visited location register 700 of FIG. 23, and this is returned through the interworking location register 500 of FIG. 17 and the home location register 800 of FIG. 24.

Note that, the interworking location register of each embodiment described above may be provided in either one of the mobile communication network 210 (310) or the mobile communication network 211 (311) as a physical device independent from the visited location register, the home location register, and the gateway location register.

In a case where the interworking location register is realized as an independent physical device in this manner, the interworking location register should be connected with the home location register or the visited location register of the mobile communication network 210 (310) and the home location register or the gateway location register of the mobile communication network 211 (311), and the communication between the location registers over the mobile communication networks should be made to pass through the interworking location register.

Also, the interworking location register may be provided inside respective devices of the visited location register, the home location register, and the gateway location register.

In a case where the interworking location register is realized by being distributed in this manner, for the communication between the home location register of the mobile communication network 211 (311) and the visited location register of the mobile communication network 210 (310), it is possible to consider a case in which the home location register of the mobile communication network 211 (311) also plays the role of the interworking location register, and a case in which the visited location register of the mobile communication network 210 (310) also plays the role of the interworking location register. In addition, for the communication between the home location register of the mobile communication network 210 (310) and the gateway location register of the mobile communication network 211 (311), it is possible to consider a case in which the home location register of the mobile communication network 210 (310) also plays the role of the interworking location register, and a case in which the gateway location register of the mobile communication network 211 (311) also plays the role of the interworking location register.

By implementing the interworking location register in any of the forms described above using software or hardware, it is possible to realize the roaming mobile communication system and method of the present invention on a basis of the already existing mobile communication system.

We claim:

1. A roaming mobile communication system, comprising:
    a first mobile communication network in which a visited location register of a visited network visited by a mobile subscriber temporarily allocates a first roaming number at a time of call termination connection for a received call to a mobile subscriber;
    a second mobile communication network in which a gateway location register of a visited network visited by a mobile subscriber allocates a second roaming number at a time of position registration of a mobile subscriber; and
    an interworking location register, which is connected between the first mobile communication network and the second mobile communication network, and which functions as a visited location register from a viewpoint of the first mobile communication network and as a home location register from a viewpoint of the second mobile communication network when a mobile subscriber of the first mobile communication network roams to the second mobile communication network, and which functions as a home location register from a viewpoint of the first mobile communication network and as a gateway location register from a viewpoint of the second mobile communication network when a mobile subscriber of the second mobile communication network roams to the first mobile communication network, during the time of call termination connection and position registration of the first mobile communication network and the second mobile communication network, respectively.

2. The roaming mobile communication system as described in claim 1, wherein:
    the first mobile communication network has a first switching center for controlling communication channels, a home location register for storing information on mobile subscribers belonging to the first mobile communication network, and the visited location register for temporarily storing information on visiting mobile subscribers;
    the second mobile communication network has a second switching center for controlling communication channels, a home location register for storing information on mobile subscribers belonging to the second mobile communication network, and the gateway location register for storing information on visiting mobile subscribers; and
    the interworking location register is connected with the home location register and the visited location register of the first mobile communication network and the home location register and the gateway location register of the second mobile communication network.

3. The roaming mobile communication system as described in claim 2, wherein,
    when a mobile subscriber belonging to the first mobile communication network roams from the first mobile communication network to the second mobile communication network at the time of position registration of the second mobile communication network, the gateway location register of the second mobile communication network allocates the second roaming number to the roamed mobile subscriber and notifies the allocated second roaming number to the interworking location register, the interworking location register stores said allocated second roaming number while notifying its own interworking location register ID number to the home location register of the first mobile communication network, and the home location register of the first mobile communication network stores said interworking location register ID number.

4. The roaming mobile communication system as described in claim 3, wherein,
    when a received call for the roamed mobile subscriber occurs and is routed to the first switching center of the first mobile communication network, the home location register of the first mobile communication network requests the allocated second roaming number for the roamed mobile subscriber from the interworking location register, the interworking location register returns the allocated second roaming number stored therein, and the first switching center of the first mobile communication network makes a call termination connection for the received call to the second switching center of the second mobile communication network according to the returned second roaming number.

5. The roaming mobile communication system as described in claim 2, wherein,
    when a mobile subscriber belonging to the second mobile communication network roams from the second mobile communication network to the first mobile communication network, at a time of position registration at the first mobile communication network, the visited location register of the first mobile communication network notifies its own visited location register ID number to the interworking location register, the interworking location register stores said visited location register ID number while notifying its own interworking location register ID number to the home location register of the second mobile communication network, and the home location register of the second mobile communication network stores said interworking location register ID number.

6. The roaming mobile communication system as described in claim 5, wherein,
    when a received call for the roamed mobile subscriber occurs and is routed to the second switching center of the second mobile communication network, the home location register of the second mobile communication network requests an allocation of the first roaming number for the roamed mobile subscriber from the interworking location register, the interworking location register requests an allocation of the first roaming number from the visited location register of the first mobile communication network, the visited location register of the first mobile communication network allocates the first roaming number to the roamed mobile subscriber and returns the allocated first roaming number to the interworking location register, the interworking location register returns the allocated first roaming number to the home location register of the second mobile communication network, and the second switching center of the second mobile communication network makes a call termination connection for the received call to the first switching center of the first mobile communication network according to the returned first roaming number.

7. The roaming mobile communication system as described in claim 1, wherein one mobile communication network among the first mobile communication network and the second mobile communication network supports a personal mobile communication in which a subscriber number assigned to a mobile subscriber and a mobile terminal number assigned to a mobile terminal are arbitrarily set in correspondence, and has a mobile terminal home location register for holding a mobile terminal information on a mobile terminal belonging to said one mobile communication network which is identified by a mobile terminal number, and a user gateway location register for holding a subscriber information on a mobile subscriber belonging to the other mobile communication network which is identified by a subscriber number, the other mobile communication network among the first mobile communication network and the second mobile communication network supports a mobile communication in which a mobile subscriber and a mobile terminal are integrally identified by a subscriber number and a correspondence between a mobile subscriber and a mobile terminal is fixed, and has a home location register for integrally holding a subscriber information on a mobile subscriber and a mobile terminal information on a mobile terminal which are identified by a subscriber number, and the interworking location register has information filter means for reading out a subscriber information and a mobile terminal information from the home location register of the other mobile communication network by using a subscriber number of a mobile subscriber as a key, and extracting a roaming subscriber information by filtering only information necessary for roaming from read out subscriber information and mobile terminal information, and controls to store the roaming subscriber information extracted by the filter means in the user gateway location register of said one mobile communication network by using a subscriber number of the subscriber as a key, at a time of carrying out a position registration for a mobile subscriber belonging to the other mobile communication network to said one mobile communication network through a mobile terminal belonging to said one mobile communication network.

8. A roaming mobile communication method, comprising the steps of:

connecting a first mobile communication network in which a visited location register of a visited network visited by a mobile subscriber temporarily allocates a first roaming number at a time of call termination connection for a received call to a mobile subscriber, and a second mobile communication network in which a gateway location register of a visited network visited by a mobile subscriber allocates a second roaming number at a time of position registration of a mobile subscriber, through an interworking location register; and controlling a system formed by the first mobile communication network, the second mobile communication network, and the interworking location register such that the interworking location register functions as a visited location register from a viewpoint of the first mobile communication network and as a home location register from a viewpoint of the second mobile communication network when a mobile subscriber of the first mobile communication network roams to the second mobile communication network, and functions as a home location register from a viewpoint of the first mobile communication network and as a gateway location register from a viewpoint of the second mobile communication network when a mobile subscriber of the second mobile communication network roams to the first mobile communication network, during the time of call termination connection and position registration of the first mobile communication network and the second mobile communication network, respectively.

9. The roaming mobile communication method as described in claim 8, wherein in the connecting step, the first mobile communication network has a first switching center for controlling communication channels, a home location register for storing information on mobile subscribers belonging to the first mobile communication network, and the visited location register for temporarily storing information on visiting mobile subscribers, the second mobile communication network has a second switching center for controlling communication channels, a home location register for storing information on mobile subscribers belonging to the second mobile communication network, and the gateway location register for storing information on visiting mobile subscribers, and the interworking location register is connected with the home location register and the visited location register of the first mobile communication network and the home location register and the gateway location register of the second mobile communication network.

10. The roaming mobile communication method as described in claim 9, wherein the controlling step controls the system such that, when a mobile subscriber belonging to the first mobile communication network roams from the first mobile communication network to the second mobile communication network at the time of position registration of the second mobile communication network, the gateway location register of the second mobile communication network allocates the second roaming number to the roamed mobile subscriber and notifies the allocated second roaming number to the interworking location register, the interworking location register stores said allocated second roaming number while notifying its own interworking location register ID number to the home location register of the first mobile communication network, and the home location register of the first mobile communication network stores said interworking location register ID number.

11. The roaming mobile communication method as described in claim 10, wherein the controlling step controls the system such that, when a received call for the roamed mobile subscriber occurs and is routed to the first switching center of the first mobile communication network, the home location register of the first mobile communication network requests the allocated second roaming number for the roamed mobile subscriber from the interworking location register, the interworking location register returns the allocated second roaming number stored therein, and the first switching center of the first mobile communication network makes a call termination connection for the received call to the second switching center of the second mobile communication network according to the returned second roaming number.

12. The roaming mobile communication method as described in claim 9, wherein the controlling step controls the system such that, when a mobile subscriber belonging to the second mobile communication network roams from the second mobile communication network to the first mobile communication network, at a time of position registration at the first mobile communication network, the visited location register of the first mobile communication network notifies its own visited location register ID number to the interworking location register, the interworking location register stores said visited location register ID number while notifying its own interworking location register ID number to the home location register of the second mobile communication network, and the home location register of the second mobile communication network stores said interworking location register ID number.

13. The roaming mobile communication method as described in claim 12, wherein the controlling step controls the system such that, when a received call for the roamed mobile subscriber occurs and is routed to the second switching center of the second mobile communication network, the home location register of the second mobile communication network requests an allocation of the first roaming number for the roamed mobile subscriber from the interworking location register, the interworking location register requests an allocation of the first roaming number from the visited location register of the first mobile communication network, the visited location register of the first mobile communication network allocates the first roaming number to the roamed mobile subscriber and returns the allocated first roaming number to the interworking location register, the interworking location register returns the allocated first roaming number to the home location register of the second mobile communication network, and the second switching center of the second mobile communication network makes a call termination connection for the received call to the first switching center of the first mobile communication network according to the returned first roaming number.

14. The roaming mobile communication method as described in claim 8, wherein
at the connecting step, one mobile communication network among the first mobile communication network and the second mobile communication network supports a personal mobile communication in which a subscriber number assigned to a mobile subscriber and a mobile terminal number assigned to a mobile terminal are arbitrarily set in correspondence, and has a mobile terminal home location register for holding a mobile terminal information on a mobile terminal belonging to said one mobile communication network which is identified by a mobile terminal number, and a user gateway location register for holding a subscriber information on a mobile subscriber belonging to the other mobile communication network which is identified by a subscriber number, and the other mobile communication network among the first mobile communication network and the second mobile communication network supports a mobile communication in which a mobile subscriber and a mobile terminal are integrally identified by a subscriber number and a correspondence between a mobile subscriber and a mobile terminal is fixed, and has a home location register for integrally holding a subscriber information on a mobile subscriber and a mobile terminal information on a mobile terminal which are identified by a subscriber number, and
the controlling step controls the system such that, the interworking location register reads out a subscriber information and a mobile terminal information from the home location register of the other mobile communication network by using a subscriber number of a mobile subscriber as a key, extracts a roaming subscriber information by filtering only information necessary for roaming from read out subscriber information and mobile terminal information, and stores an extracted roaming subscriber information in the user gateway location register of said one mobile communication network by using a subscriber number of the subscriber as a key, at a time of carrying out a position registration for a mobile subscriber belonging to the other mobile communication network to said one mobile communication network through a mobile terminal belonging to said one mobile communication network.

15. A location register apparatus for a roaming mobile communication system, comprising:
connection means for connecting a first mobile communication network in which a visited location register of a visited network visited by a mobile subscriber temporarily allocates a first roaming number at a tine of call termination connection for a received call to a mobile subscriber, and a second mobile communication network in which a gateway location register of a visited network visited by a mobile subscriber allocates a second roaming number at a time of position registration of a mobile subscriber; and
function means for functioning as a visited location register from a viewpoint of the first mobile communication network and as a home location register from a viewpoint of the second mobile communication network when a mobile subscriber of the first mobile communication network roams to the second mobile communication network, and functioning as a home location register from a viewpoint of the first mobile communication network and as a gateway location register from a viewpoint of the second mobile communication network when a mobile subscriber of the second mobile communication network roams to the first mobile communication network, during the time of call termination and position registration of the first mobile communication network and the second mobile communication, respectively.

16. The location register apparatus for a roaming mobile communication system as described in claim 15, wherein:
the first mobile communication network has a first switching center for controlling communication channels, a home location register for storing information on mobile subscribers belonging to the first mobile communication network, and the visited location register for temporarily storing information on visiting mobile subscribers;
the second mobile communication network has a second switching center for controlling communication channels, a home location register for storing information on mobile subscribers belonging to the second mobile communication network, and the gateway location register for storing information on visiting mobile subscribers; and
the connection means is connected with the home location register and the visited location register of the first mobile communication network and the home location register and the gateway location register of the second mobile communication network.

17. The location register apparatus for a roaming mobile communication system as described in claim 16, wherein, when a mobile subscriber belonging to the first mobile communication network roams from the first mobile communication network to the second mobile communication network at the time of position registration of the second mobile communication network, the gateway location register of the second mobile communication network allocates the second roaming number to the roamed mobile subscriber and notifies the allocated second roaming number to said location register apparatus, said location register apparatus stores said allocated second roaming number while notifying its own location register apparatus ID number to the home location register of the first mobile communication network, and the home location register of the first mobile communication network stores said location register apparatus ID number.

18. The location register apparatus for a roaming mobile communication system as described in claim 17, wherein, when a received call for the roamed mobile subscriber occurs and is routed to the first switching center of the first mobile communication network, the home location register of the first mobile communication network requests the allocated second roaming number for the roamed mobile subscriber from said location register apparatus, said location register apparatus returns the allocated second roaming number stored therein, and the first switching center of the first mobile communication network makes a call termination connection for the received call to the second switching center of the second mobile communication network according to the returned second roaming number.

19. The location register apparatus for a roaming mobile communication system as described in claim 16, wherein, when a mobile subscriber belonging to the second mobile communication network roams from the second mobile communication network to the first mobile communication network, at a time of position registration of the first mobile communication network, the visited location register of the first mobile communication network notifies its own visited location register ID number to said location register apparatus, said location register apparatus stores said visited location register ID number while notifying its own location register apparatus ID number to the home location register of the second mobile communication network, and the home location register of the second mobile communication network stores said location register apparatus ID number.

20. The location register apparatus for a roaming mobile communication system as described in claim 19, wherein, when a received call for the roamed mobile subscriber occurs and is routed to the second switching center of the second mobile communication network, the home location register of the second mobile communication network requests an allocation of the first roaming number for the roamed mobile subscriber from said location register apparatus, said location register apparatus requests an allocation of the first roaming number from the visited location register of the first mobile communication network, the visited location register of the first mobile communication network allocates the first roaming number to the roamed mobile subscriber and returns the allocated first roaming number to said location register apparatus, said location register apparatus returns the allocated first roaming number to the home location register of the second mobile communication network, and the second switching center of the second mobile communication network makes a call termination connection for the received call to the first switching center of the first mobile communication network according to the returned first roaming number.

21. The location register apparatus for a roaming mobile communication system as described in claim 15, wherein one mobile communication network among the first mobile communication network and the second mobile communication network supports a personal mobile communication in which a subscriber number assigned to a mobile subscriber and a mobile terminal number assigned to a mobile terminal are arbitrarily set in correspondence, and has a mobile terminal home location register for holding a mobile terminal information on a mobile terminal belonging to said one mobile communication network which is identified by a mobile terminal number, and a user gateway location register for holding a subscriber information on a mobile subscriber belonging to the other mobile communication network which is identified by a subscriber number, the other mobile communication network among the first mobile communication network and the second mobile communication network supports a mobile communication in which a mobile subscriber and a mobile terminal are integrally identified by a subscriber number and a correspondence between a mobile subscriber and a mobile terminal is fixed, and has a home location register for integrally holding a subscriber information on a mobile subscriber and a mobile terminal information on a mobile terminal which are identified by a subscriber number, and said location register apparatus has information filter means for reading out a subscriber information and a mobile terminal information from the home location register of the other mobile communication network by using a subscriber number of a mobile subscriber as a key, and extracting a roaming subscriber information by filtering only information necessary for roaming from read out subscriber information and mobile terminal information, and the function means controls to store the roaming subscriber information extracted by the filter means in the user gateway location register of said one mobile communication network by using a subscriber number of the subscriber as a key, at a time of carrying out a position registration for a mobile subscriber belonging to the other mobile communication network to said one mobile communication network through a mobile terminal belonging to said one mobile communication network.

* * * * *